(12) United States Patent
Kano

(10) Patent No.: US 7,710,860 B2
(45) Date of Patent: May 4, 2010

(54) DATA RELAY APPARATUS AND DATA RELAY METHOD

(75) Inventor: Shinya Kano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 985 days.

(21) Appl. No.: 11/166,804

(22) Filed: Jun. 24, 2005

(65) Prior Publication Data
US 2006/0203720 A1 Sep. 14, 2006

(30) Foreign Application Priority Data
Mar. 9, 2005 (JP) ............................. 2005-065835

(51) Int. Cl.
H04J 3/14 (2006.01)
(52) U.S. Cl. ...................... 370/216; 370/248
(58) Field of Classification Search ......... 370/216–228, 370/248, 351, 241, 250; 379/1.01, 9, 14, 379/14.01; 704/200, 231, 236, 238
See application file for complete search history.

(56) References Cited

U.S. PATENT DOCUMENTS

| 7,289,431 B2 | 10/2007 | Iijima | |
| 2002/0172150 A1* | 11/2002 | Kano | 370/216 |
| 2003/0147346 A1 | 8/2003 | Kanakubo | |
| 2004/0103210 A1* | 5/2004 | Fujii et al. | 709/239 |
| 2006/0092828 A1* | 5/2006 | Aoki et al. | 370/216 |

FOREIGN PATENT DOCUMENTS

| JP | 2003-78553 | 3/2003 |
| JP | 2003-179628 | 6/2003 |
| JP | 2003-229888 | 8/2003 |
| JP | 2003-244202 | 8/2003 |
| JP | 2003-338831 | 11/2003 |
| JP | 2003338831 A * | 11/2003 |

OTHER PUBLICATIONS

Notice of Rejection mailed Dec. 1, 2009, from the corresponding Japanese Application.

* cited by examiner

Primary Examiner—Kwang B Yao
Assistant Examiner—Obaidul Huq
(74) Attorney, Agent, or Firm—Katten Muchin Rosenman LLP

(57) ABSTRACT

A failure-recovery-information storing unit stores failure-recovery information in which a working path is associated with a backup path. A failure-occurrence-notification receiving unit receives a failure-occurrence notification indicating that a failure has occurred in the working path. A backup-path searching unit searches for a backup path corresponding to the working path on which the failure has occurred, based on the failure-recovery information. A path-switch processing unit carries out a path-switch process, in such a manner that the data to be transferred using the working path in which the failure has occurred is transferred using the backup path.

16 Claims, 30 Drawing Sheets

FIG.2

| PATH ID | INPUT IF | INPUT LABEL | OUTPUT IF | OUTPUT LABEL |
|---------|----------|-------------|-----------|--------------|
| #1 | A | a | B | b |
| ⋮ | ⋮ | ⋮ | ⋮ | ⋮ |

FIG.3

| CURRENT-PATH ID | BACKUP-PATH ID | MONITOR-PATH ID |
|-----------------|----------------|-----------------|
| #1 | #10 | #100 |
| ⋮ | ⋮ | ⋮ |

LABEL TABLE
(FOR SAKE OF EXPLANATION, THE LABEL IS DESCRIBED FOR A PART OF THE RESV MESSAGE ONLY)

FIG.25

| WORKING PATH ID | BACKUP PATH ID | REPRESENTATIVE PATH ID | FAILURE SECTION (FAILURE-POINT LIST) |
|---|---|---|---|
| #1 | #10 | #1 | NODE 2-NODE 3-NODE 4 |
| #2 | #20 | #1 | NODE 2-NODE 3-NODE 4 |
| ⋮ | ⋮ | ⋮ | ⋮ |

FIG.29

| WORKING PATH ID | BACKUP PATH ID | FAILURE SECTION (FAILURE-POINT LIST) |
|---|---|---|
| #1 | #10 | NODE 2-NODE 3-NODE 4 |
| #2 | #20 | NODE 2-NODE 3-NODE 4 |
| ⋮ | ⋮ | ⋮ |

| FAILURE SECTION (FAILURE-POINT LIST) | WORKING PATH ID | BACKUP PATH ID |
|---|---|---|
| NODE 2-NODE 3 | #1 | #10 |
| NODE 2-NODE 3 | #2 | #20 |
| NODE 3-NODE 4 | #1 | #10 |
| NODE 3-NODE 4 | #2 | #20 |
| ⋮ | ⋮ | ⋮ |

DATA RELAY APPARATUS AND DATA RELAY METHOD

BACKGROUND OF THE INVENTION

1. Field of the Invention

The present invention relates to a data relay apparatus and a data relay method to relay data in a network, which carries out a failure recovery, when a failure occurs at any point on a working path that is being used as a path through which data is transferred via a plurality of data relay apparatuses, by switching the path to a backup path to make a detour to avoid the failure point, and more particularly to a data relay apparatus and a data relay method that can reduce the number of path used to recover the failure by increasing the number of working paths that can be handled by a single path used to recover the failure, such as a monitor path.

2. Description of the Related Art

The generalized multi-protocol label switching (GMPLS)/MPLS is a technology to transfer data according to label information. The label information includes a fixed-length label that is attached to a head of a packet, a time slot in a time division transmission, and an optical wavelength in an optical-multiplexed transmission. In particular, a network in which data is transferred using the fixed-length label that is attached to a head of a packet is referred to as the MPLS. In addition, the GMPLS network uses a single piece or a plurality of pieces of information including the fixed-length label used in the MPLS network.

For example, in a packet transmission using the fixed-length label, a relay node (a label switch router (LSR)) holds a label table that represents a relation of an output label and an output interface (IF) with respect to an input label and an input IF. At a time of packet relay, an output IF is determined according to a label attached to a packet received, instead of an address. Then, the label attached to the packet is rewritten into the output label to be relayed. By repeating this procedure, the packet is transmitted to a destination. A relay node (start-point node) of the MPLS network attaches the label at the beginning. The MPLS is such kind of high-speed packet relay technology.

FIG. 34 is a schematic diagram for explaining a packet transmission using the fixed-length label. The figure illustrates an example of transferring a packet from LSR1 to LSR4. First of all, the LSR1 attaches a label a to the packet to be transferred. An LSR2 receives the packet having the label a from an IF#1, searches for a label table, and acquires an output IF and an output label. After that, the LSR2 rewrites the label of the packet into an output label, and outputs the packet to an output IF. The MPLS transfers the packet to the LSR4 of an end-point by repeating such kind of process at each of the LSRs.

In this manner, the MPLS can enhance the speed of the packet relay by transferring the packet according to the fixed-length label. In addition, the MPLS can assure a bandwidth for each of the packet flows by associating a bandwidth control in the relay node with each of the labels.

Furthermore, in the time division transmission, each of the nodes holds a label table that represents a relation of an output label and an output IF with respect to an input label and an input IF. Then, each of the nodes determines an output IF and an output time slot according to a reception IF and a reception time slot, and outputs data to the output time slot of the output IF. By repeating this procedure, the data is transmitted to a destination.

Moreover, in the optical-multiplexed transmission, each of the nodes holds a label table that represents a relation of an output optical wavelength and an output IF with respect to an input optical wavelength and an input IF. Then, each of the nodes determines an output IF and an output optical wavelength according to a reception IF and a reception optical wavelength, converts the reception optical wavelength into the output optical wavelength, and outputs the output optical wavelength to the output IF. By repeating this procedure, the data is transmitted to a destination.

The GMPLS is a technology to carry out a data transfer in the same mechanism by handling the fixed-length label, the time slot, and the optical wavelength as a label.

In the GMPLS/MPLS, it is necessary to build a label table at each of the nodes, and a path-establishing signal protocol (such as CR-LDP/RSVP-TE) is used for building the label table. The following is an explanation of an operation for a path establishment with the RSVP-TE as an example.

FIG. 35 is a schematic diagram for explaining an operation of the path-establishing signal protocol (RSVP-TE). As shown in the figure, a start-point node that requests a path establishment transmits a request message for the path establishment (Path message) to an end-point node of the path by Hop-by-Hop. In the schematic diagram shown in FIG. 35, information on a relay node to be routed through is inserted in the Path message, for designating a path explicitly.

The end-point node that receives the Path message returns a path-establishment response message (Resv message) to carry out an assignment of the label to the start-point node along the path through which the Path message is transmitted. At this moment, a label table for transferring data is built by registering a label stored in the Resv message to the label table. A path ID is stored in both of the Path message and the Resv message, and the path ID is also registered to the label table accordingly.

In the path-establishment signal protocol, a PathErr/ResvTear/Notify message is used as a failure message for notifying that a failure has occurred in a path established, in addition to the Path message indicating a request for a path establishment and the Resv message that is a response to the Path message.

FIG. 36 is a schematic diagram for illustrating a transfer of a failure message using a PathErr/ResvTear message. As shown in the figure, the PathErr/ResvTear message is transferred to the start-point node by Hop-by-Hop along the path. On the other hand, a Notify message is directly transferred to the start-point node that is a destination for a message. For this reason, the Notify message may also arrives at the start-point node along a route that is different from the path. In the failure message, the same path ID as the path ID stored in the Path/Resv message, so that it is possible to carry out an association between the failure and the path.

In the GMPLS/MPLS, when a failure occurs in a working path for transferring data, the transfer of the data is carried out using a backup path that makes a detour around the working path. For example, in the MPLS, the working path is monitored using a monitoring path, and when a failure occurs in the working path, a failure recovery process is carried out by switching the working path to a backup path (see, for example, Japanese Patent Application Laid-Open Publication No. 2003-338831).

FIG. 37 is a schematic diagram for explaining a failure recovery method using a monitoring path. As shown in the figure, in the failure recovery using the monitoring path, a working path and a backup path for making a traffic on the working path take a detour at a time of a failure occurrence, using the path-establishment signaling protocol. At this moment, the backup path is established between the same start-point node and end-point node as those of the working path.

Furthermore, a monitoring path for monitoring a status of the working path is established using the path-establishment signaling protocol. The monitoring path includes, as shown in FIG. 37, two paths in both a downstream direction and an upstream direction along the working path. A monitoring packet is reciprocated on the two monitoring paths periodically. This monitoring packet is a labeled packet because it is transmitted on the monitoring path.

When there is a failure on the working path, the start-point node "LSR1" detects the failure by one of the following methods. One of the methods is to detect the failure by a fact that the monitoring packet that is supposed to be transmitted and received periodically does not arrive within a predetermined time. Another method is to detect the failure by a relay node on the upstream, and to transfer a failure notification packet with a labeled packet by the relay node.

Upon recognizing that a failure has occurred by one of the above two methods, the start-point node transmits the traffic that was being transmitted to the working path to the backup path to make a detour around the failure. One monitoring path can be established for a plurality of working paths that is established on the same route, as shown in FIG. 37. This will decrease a total number of the monitoring paths.

However, in the conventional technology described above, since the backup path is limited to a plurality of paths having the same route only, it is not possible to increase the number of the working paths that can be handled with one monitoring path. For this reason, the number of the monitoring paths is inevitably increased.

Furthermore, the fact that it is necessary to establish two monitoring paths for one sector is another factor for increasing the number of the monitoring paths. In consequence, the number of the monitoring paths to be managed on a network is increased, resulting in an increase of a management load.

Moreover, since it is necessary to transmit and receive the monitoring packet periodically, the monitoring packet consumes a bandwidth even for a normal time. In addition, since the notification packet for notifying the failure is inserted from the relay node, not from an entrance node of the path, it is necessary to install a function for inserting a packet from a relay node of the path.

It is an object of the present invention to solve the above problems in the conventional technology and to provide a data relay apparatus and a data relay method that can reduce the number of paths for a recovery of a failure by increasing the number of working paths that can be handled by a single path for the recovery of the failure, such as a monitoring path.

As a failure recovery method, there are several methods disclosed so far, such as a path detour method using an error message of the signaling protocol, a fast rerouting method explored by IETF (Internet Draft: draft-iert-mpls-rsvp-lsp-fastreroute-07.txt), and a path detour method using a multiple addressing of failure information (Yasuki fujii, Keiji Miyazaki, Kohei Iseda, "Review of preplan-type failure recovery method", Singakugiho TM2000-60, pp. 67-72, November 2000).

However, the path detour method using the signaling protocol has a problem that, when a failure that affects a plurality of paths occurs, a number of message are generated, which increases a network load. The fast rerouting method has a problem of increasing the number of backup paths because it is necessary to establish the same number of backup paths as the number of links through which the working path passes. The path detour method using the multiple addressing of the failure information has a problem that a packet to an unrelated node is generated because a multiple-address packet is used.

SUMMARY OF THE INVENTION

It is an object of the present invention to solve at least the above problems in the conventional technology.

A data relay apparatus according to one aspect of the present invention, which relays data in a network in which a failure recovery is carried out, when a failure occurs at any point on a working path that is being used as a path through which the data is transferred via a plurality of data relay apparatuses, by switching the working path to a backup path for taking a detour around a point of the failure, includes a failure-recovery-information storing unit that stores failure-recovery information in which the working path is associated with a backup path in which the data relay apparatus becomes a start point; a failure-occurrence-notification receiving unit that receives a failure-occurrence notification indicating that the failure has occurred in the working path; a backup-path searching unit that searches for a backup path corresponding to the working path on which the failure has occurred, based on the failure-recovery information; and a path-switch processing unit that carries out a path-switch process, when the backup path is searched by the backup-path searching unit, in such a manner that the data to be transferred using the working path in which the failure has occurred is transferred using the backup path.

A data relay method according to another aspect of the present invention, which is for relaying data in a network in which a failure recovery is carried out, when a failure occurs at any point on a working path that is being used as a path through which the data is transferred via a plurality of data relay apparatuses, by switching the working path to a backup path for taking a detour around a point of the failure, includes receiving including a start-point data-relay-apparatus receiving a failure-occurrence notification indicating that the failure has occurred in the working path, the start-point data relay apparatus being a start point of a backup path corresponding to the working path on which the failure has occurred; searching including the start-point data relay apparatus searching for the backup path corresponding to the working path in which the failure has occurred, based on failure-recovery information in which the working path is associated with the backup path; and switching including the start-point data relay apparatus carry outing a path-switch process, when the backup path is searched at the searching, in such a manner that the data to be transferred using the working path in which the failure has occurred is transferred using the backup-path.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a relay-label table;

FIG. 3 is an example of a failure-recovery table;

FIG. 25 is an example of a failure-recovery table when a representative path is used;

FIG. 29 is an example of a failure-recovery table when switching a plurality of paths with a single error message;

DETAILED DESCRIPTION OF THE PREFERRED EMBODIMENTS

Exemplary embodiments of a data relay apparatus and a data relay method according to the present invention will be explained in detail below with reference to the accompanying drawings.

Figure 1:
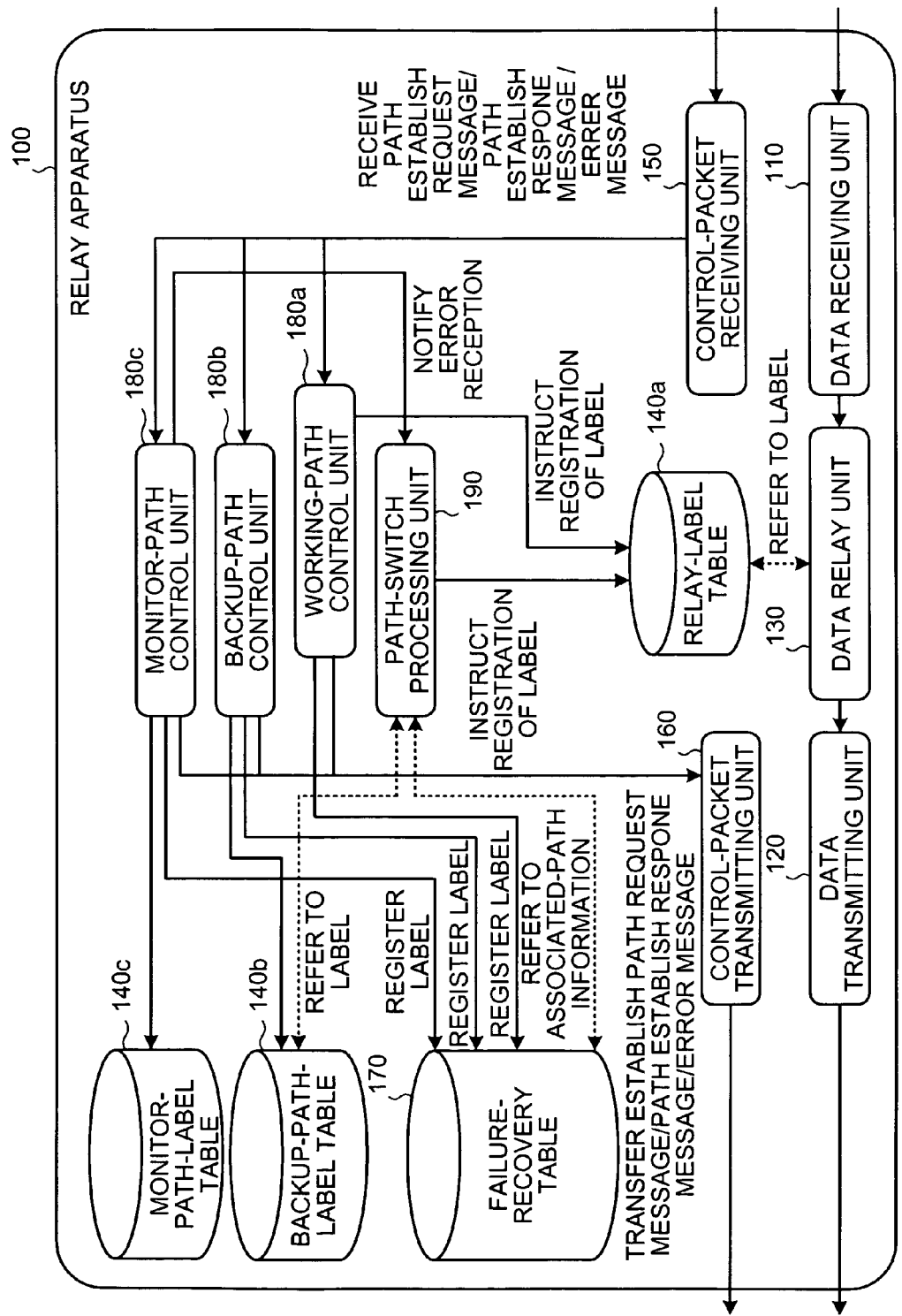
FIG. 1 is a schematic diagram of a data relay apparatus according to an embodiment of the present invention.

FIG. 1 is a schematic diagram of a data relay apparatus according to an embodiment of the present invention. As shown in the figure, the data relay apparatus 100 includes a data-receiving unit 110, a data transmitting unit 120, a data relay unit 130, a relay-label table 140a, a backup-path-label table 140b, a monitor-path label table 140c, a control-packet receiving unit 150, a control-packet transmitting unit 160, a failure-recovery table 170, a working path control unit 180a, a backup-path control unit 180b, a monitor-path control unit 180c, and a path-switch processing unit 190.

The data-receiving unit 110 receives data from a network, and delivers the data received to the data relay unit 130. The data transmitting unit 120 receives the data from the data relay unit 130, and transmits the data received to the network.

The data relay unit 130 relays the data based on the relay-label table 140a. In other words, the data relay unit 130 receives the data and an input interface (IF) from the data-receiving unit 110, and searches for an output label and an output IF from an input label and the input IF based on the relay-label table 140a. Then, the data relay unit 130 replaces the input label with the output label, and delivers the data to the data transmitting unit 120 by designating the output IF.

The relay-label table 140a stores label information used for relaying the data. FIG. 2 is an example of the relay-label table 140a. As shown in the figure, the relay-label table 140a stores a path ID for identifying a path, the input IF, the input label, the output IF, and the output label, for each of the working paths.

The backup-path-label table 140b stores label information for each of the backup paths, having the same data structure as that of the relay-label table 140a. The monitor-path label table 140c stores label information for each of the monitor paths, having the same data structure as that of the relay-label table 140a.

The control-packet receiving unit 150 receives a control packet from the network, and delivers the control packet received to any one of the working path control unit 180a, the backup-path control unit 180b, and the monitor-path control unit 180c, based on information on a path of the control packet received.

The control packet includes a path-establishment request message (PATH message), a path-establishment response message (RESV message), and an error message. The path-establishment request message (PATH message) is a message for requesting a path establishment for the working path, the backup path, and the monitoring path, including the path ID.

The path-establishment response message (RESV message) is a response message to the path-establishment request message for the working path, the backup path, and the monitoring path, including the path ID and a label for assignment.

The error message is a message for notifying an occurrence of an error on a path to a start-point node, including information on a point at which the error has occurred and the path ID. The error message is delivered to the monitor-path control unit 180*c*.

The control-packet transmitting unit 160 receives the control packet from the working path control unit 180*a*, the backup-path control unit 180*b*, and the monitor-path control unit 180*c*, and transmits the control packet received to the network.

The failure-recovery table 170 is used by the path-switch processing unit 190, when a failure occurs on the working path, to switch the working path to the backup path. FIG. 3 is an example of a failure-recovery table 170. As shown in the figure, the failure-recovery table 170 stores a working path ID for identifying the working path, a backup-path ID for identifying the backup path, and a monitoring-path ID for identifying the monitoring path, corresponding to the backup path in which the data relay apparatus itself is a start point.

The failure-recovery table 170 can make a start point of the backup path and a start point of the monitoring path different as long as the start point of the backup path is included in the monitoring path, by storing the working path and the monitoring path in association with the backup path in which the data relay apparatus itself is the start point.

The working path control unit 180*a* processes a control packet regarding to the working path. In other words, the working path control unit 180*a* transfers a PATH message following passing-node information included in the PATH message requesting a path establishment of the working path, and stores a transmission node of the PATH message.

When an RESV message is received, label information included in the RESV message received is assigned as the output label with a reception interface as the output IF; label information included in the PATH message is assigned as the input label with an interface through which the PATH message is received as the input IF.

Subsequently, the input label is replaced with a label of the RESV message received, and transmitted to the transmission node of the PATH message. The interface and the label information assigned are registered in the relay-label table 140*a*, and a path ID is registered in the working path ID of the failure-recovery table 170.

The backup-path control unit 180*b* carries out the same process, as the working path control unit 180*a* carries out for the control packet regarding to the working path, to the control packet regarding to the backup path, and registers the interface and the label information assigned in the backup-path-label table 140*b* instead of the relay-label table 140*a*.

In addition, when the data relay apparatus itself is a start point of the backup path, the backup-path control unit 180*b* registers a backup-path ID corresponding to the working path ID registered in the failure-recovery table 170, and when the data relay apparatus itself is not the start point of the backup path, deletes the working path ID registered in the failure-recovery table 170 corresponding to the backup-path ID.

The monitor-path control unit 180*c* carries out the same process, as the working path control unit 180*a* carries out for the control packet regarding to the working path, to the control packet regarding to the monitoring path, and registers the interface and the label information assigned in the monitoring-path-label table 140*c* instead of the relay-label table 140*a*.

In addition, when the data relay apparatus itself is a start point of the backup path, the monitoring-path control unit 180*c* registers a monitoring-path ID corresponding to the working path ID and the backup-path ID registered in the failure-recovery table 170. Furthermore, upon receiving an error message, the monitoring-path control unit 180*c* delivers the error message to the path-switch processing unit 190 notifying that an error has occurred on a path.

The path-switch processing unit 190, upon receiving a notification from the monitor-path control unit 180*c* of a reception of the error message, carries out a path switch from the working path to the backup path. In other words, the path-switch processing unit 190 determines whether the monitoring-path ID stored included in the error message is registered by referring to the failure-recovery table 170. When the monitoring-path ID is registered, the path-switch processing unit 190 specifies the working path and the backup path corresponding to the monitoring-path ID, because the data relay apparatus itself is the start point of the backup path. Then, the path-switch processing unit 190 extracts information on the backup path from the backup-path-label table 140*b*, and registers the information extracted in the relay-label table 140*a*. With this mechanism, the traffic on the working path is transferred to the backup path.

In this manner, the path-switch processing unit 190 determines whether the monitoring-path ID stored included in the error message is registered in the failure-recovery table 170, specifies the working path and the backup path corresponding to the monitoring-path ID when the monitoring-path ID is registered, and carries out a path switch so that the traffic on the working path is transferred to the backup path, making it possible to recover a failure of the working path.

Following explanations are for several cases of operations of the failure recovery by the data relay apparatus 100 according to the present embodiment. As the first case a failure-recovery operation by the data relay apparatus 100 according to the present embodiment is explained with reference to FIGS. 4 to 9 for a network having seven nodes. The node means the data relay apparatus. Hereinafter, the relay-label table 140*a*, the backup-path-label table 140*b*, and the monitoring-path-label table 140*c* are collectively referred to as a label table.

Figure 4:
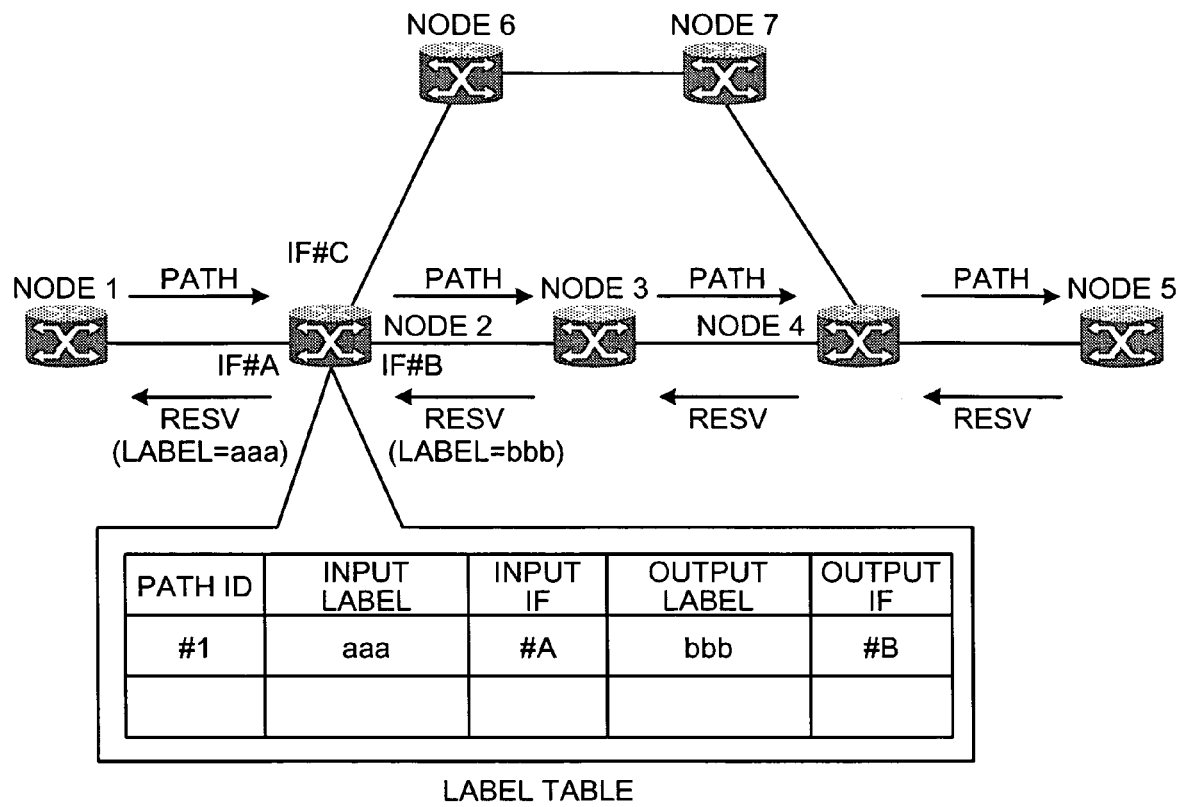
FIG. 4 is a schematic diagram for illustrating an establishment of a working path.

First, a working path is established with a route of "node 1"→"node 2"→"node 3"→"node 4"→"node 5", by using the path-establishment signaling protocol (RSVP-TE) (FIG. 4). This causes the same table as a label table belonging to the "node 2", as shown in FIG. 4, to be built on a whole route of the working path.

Figure 5:
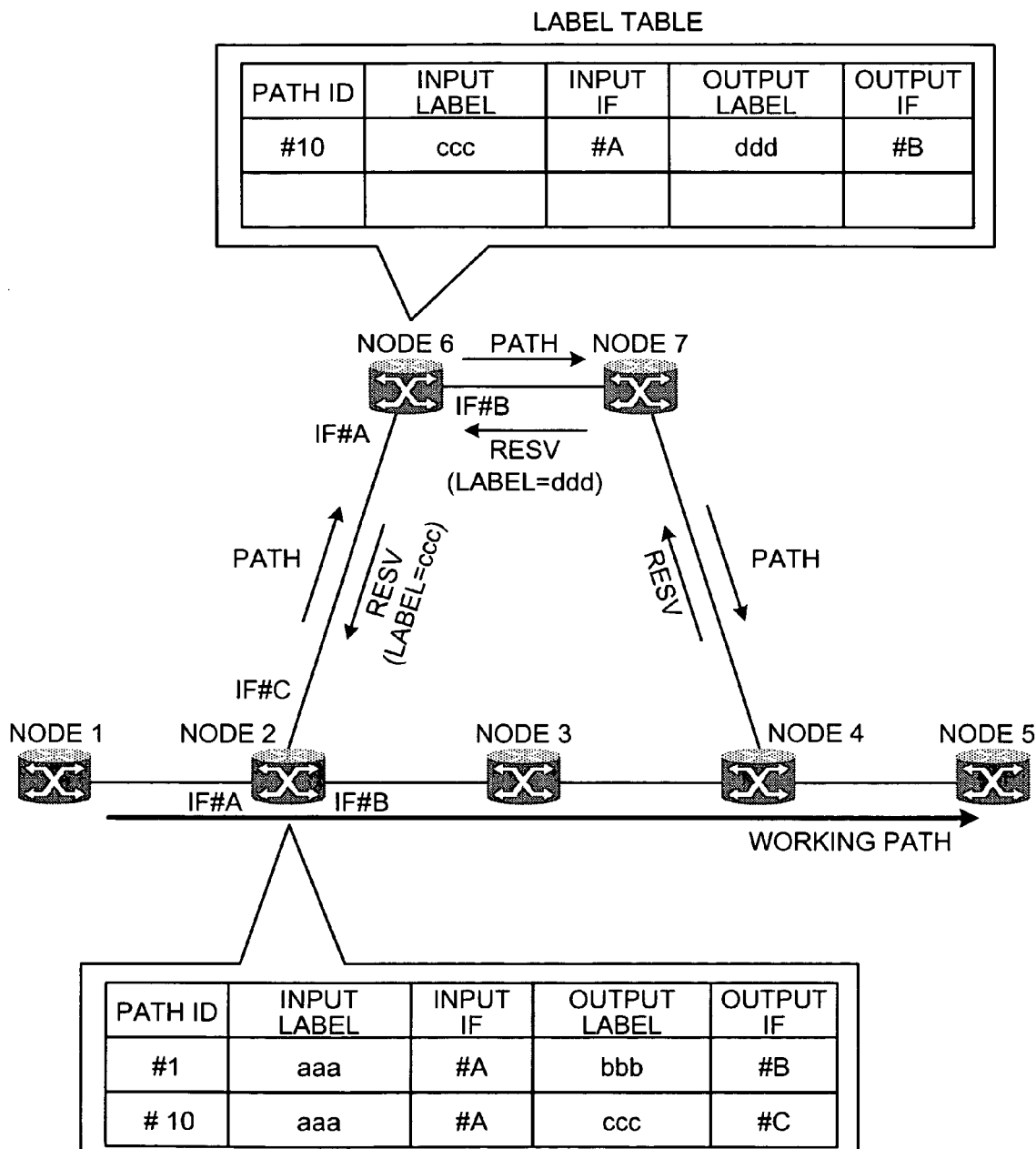
FIG. 5 is a schematic diagram for illustrating an establishment of a backup path.

To recover from a failure occurred at "node 2"-"node 3"-"node 4", a backup path of a route "node 2"→"node 6"→"node 7"→"node 4" with the "node 2" as a start point and the "node 4" as an end point is established. This backup path is also established by using the path-establishment signaling protocol (RSVP-TE), like the working path (FIG. 5). This causes the same table as a label table belonging to the "node 2" and "node 6", as shown in FIG. 5, to be built on a whole route of the backup path.

The "node 2" and "node 4" are registered in combination with a label and interface information of a corresponding working path, based on association information with the working path included in the PATH message of the backup path. As the association information with the working path, a method of determining a path ID according to an existing association rule, a method of storing the working path information in the PATH message, and the like can be used. In the label table of the "node 2" shown in FIG. 5 includes the input label and the input interface information of the working path 1.

In addition, the "node 2" that becomes a path-switch node at the time of a failure holds the failure-recovery table 170 that is an association table of the working path and the backup path. In this example, the working path ID is "#1", and the backup-path ID is "#10".

Figure 6:
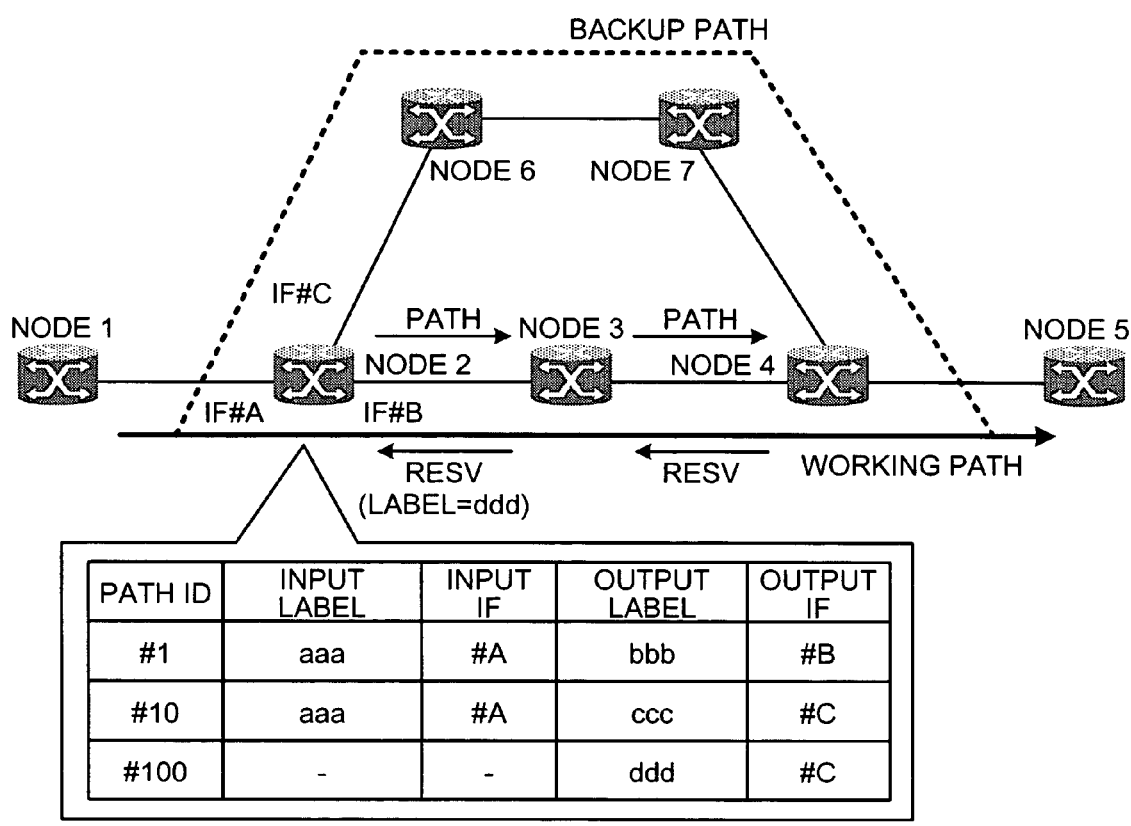
FIG. 6 is a schematic diagram for illustrating an establishment of a monitoring path.

In order to monitor a failure occurs between the "node 2"-"node 3"-"node 4" through which the working path passes, a monitoring path is established on the same route (FIG. 6). To establish the monitoring path, the path-establishment signaling protocol (RSVP-TE) is used.

Furthermore, to indicate that the path established is the monitoring path, when the path-establishment signaling protocol is carried out, information, such as a flag or an object indicating that the path is the monitoring path, is implanted, or a path ID indicating that the path is the monitoring path is assigned.

This causes the same table as the label table held by the "node 2" shown in FIG. 6 to be built on the whole route of the monitoring path. In the label table of the "node 2" shown in FIG. 6, the input label and the interface information are not registered because the "node 2" is a start-point node of the monitoring path.

Figure 7:
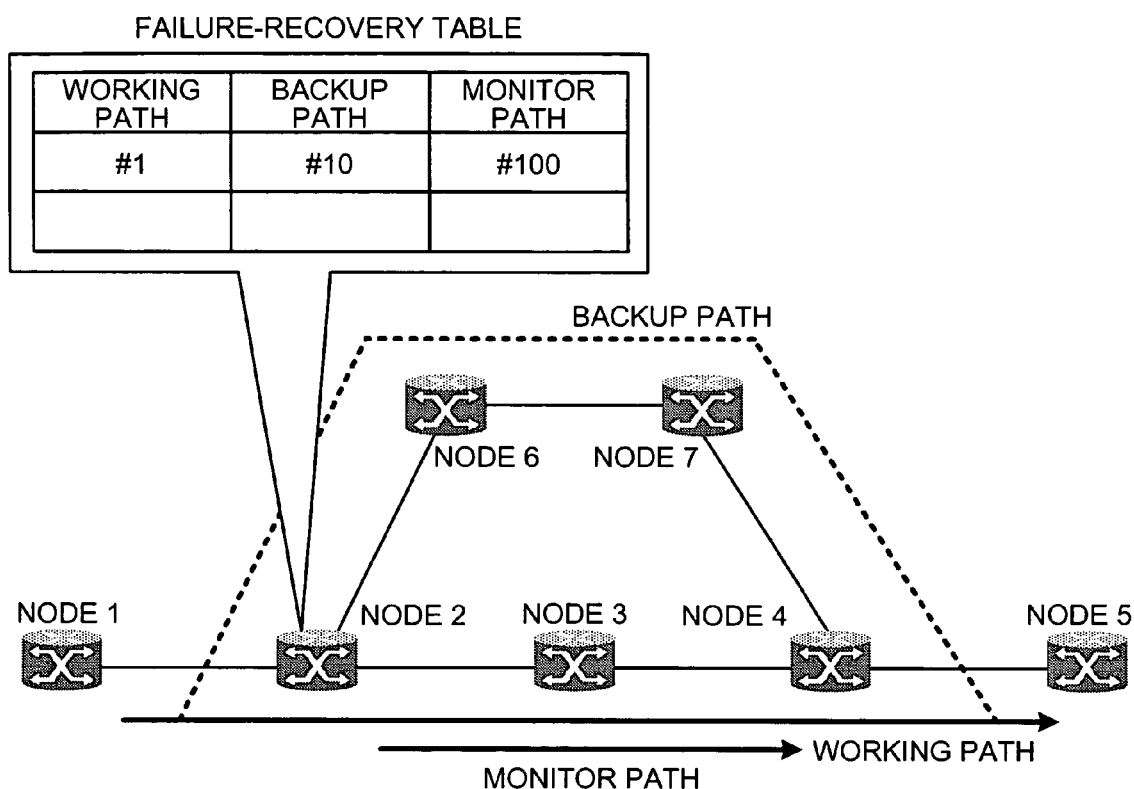
FIG. 7 is a first schematic diagram for illustrating a correspondence between a working path, a backup path, and a monitoring path.

The "node 2" that becomes a path-switch node at the time of a failure holds the failure-recovery table 170 that is an association table of the working path and the monitoring path (FIG. 7). In this example, the monitoring-path ID is "#100".

As explained above, in the path-establishment signaling protocol, there is an error message that notifies that an error has occurred on the path established, in addition to the Path message indicating a path establishment request and the Resv message that is a response to the request. A PathErr/ResvTear/Notify message is corresponding to the error message. This is used according to a type of the error, however, with any kind of error message, it is possible to realize the following operation. In the error message, a path ID that is stored in the Path/Resv message at the time of path establishment is stored.

Figure 8:
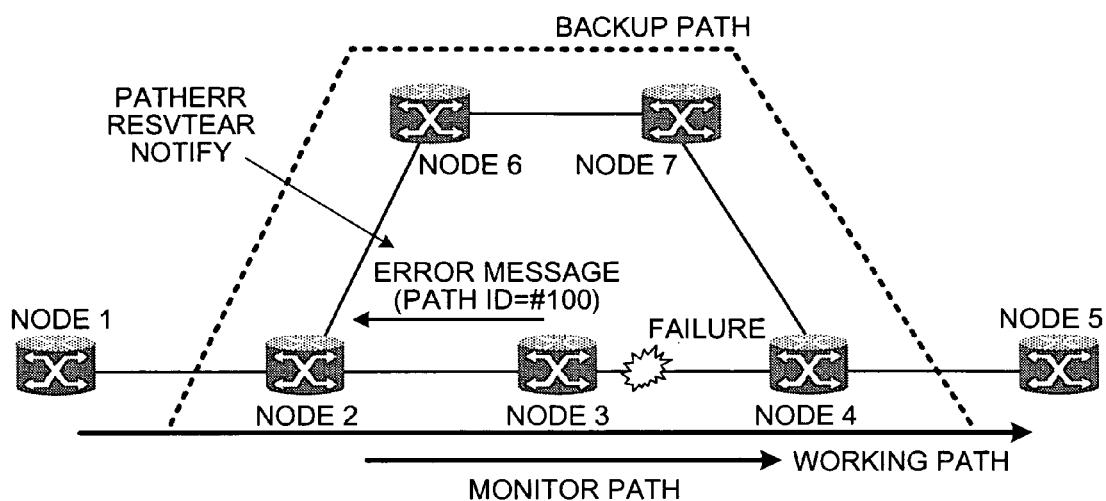
FIG. 8 is a first schematic diagram for illustrating a transmission of an error message at a time of a failure occurrence.

When a failure occurs between the "node 2"-"node 3"-"node 4", a relay node at an upstream detects the failure. In this example, there is a failure between the "node 3"-"node 4". Then, the "node 3" that detected the failure transmits an error message with respect to the monitoring path to the "node 2", to notify that the failure has occurred to the path-switch node "node 2" (FIG. 8). In the error message with respect to the monitoring path, a monitoring-path ID is included.

Figure 9:
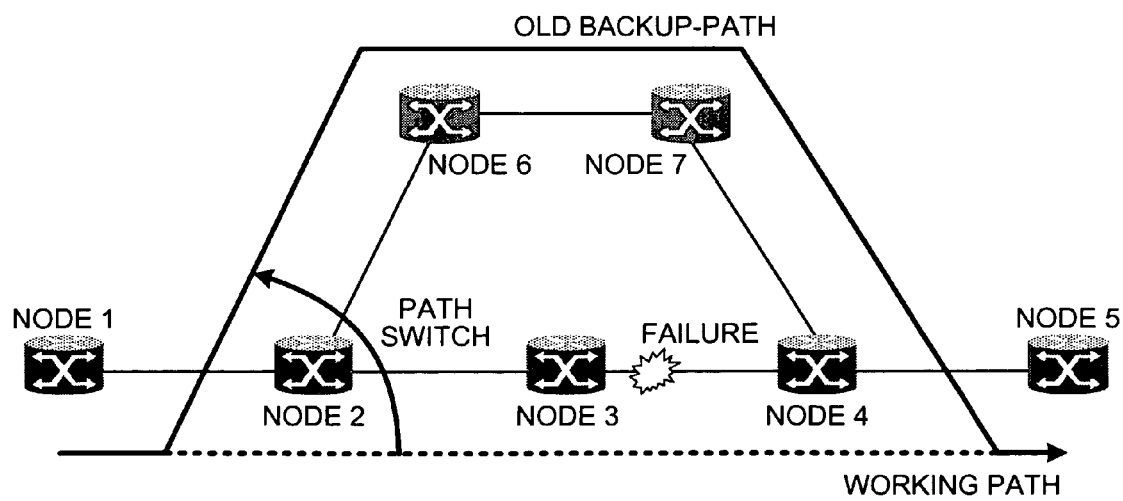
FIG. 9 is a first schematic diagram for illustrating a path switch for taking a detour around a failure.

The "node 2" that received the error message searches the failure-recovery table 170, based on the path ID stored in the error message, and identifies the working path and the backup path. Then, the failure is recovered by transmitting the traffic of the working path searched to a corresponding backup path (FIG. 9).

In the first case, when a failure occurs between the "node 3"-"node 4", the "node 3" detects the failure, and transmits an error message with respect to a monitoring path to the "node 2" without transmitting the error message with respect to the working path. In this manner, by suppressing a function of transmitting the error message defined by the path-establishment signaling protocol, it is possible to reduce an unnecessary message.

Furthermore, in the first case, although a great effect is not obtained because one monitoring path is associated with one working path, if one monitoring path is associated with a plurality of working paths, as will be explained in a second case, it is possible to greatly reduce the number of error messages created at a time of a failure.

In addition, in the first case, when a failure occurs between the "node 3"-"node 4", the "node 3" detects the failure, and transmits an error message with respect to a monitoring path to the "node 2". However, a transmission of the error message with respect to the working path is defined in the path-establishment signaling protocol. Therefore, it is necessary to add a function of suppressing the transmission of the error message with respect to the working path.

On the other hand, it is possible to realize the above operation without adding the function of suppressing the transmission of the error message with respect to the working path, by transmitting the error message with respect to the monitoring path prior to transmitting the error message with respect to the working path. In other words, when two packets are transmitted substantially at the same time, there is a possibility that the packet arrived later is discarded when being relayed due to a load and a process capability of a relay node. Therefore, by transmitting the error packet for the monitoring path in advance, it is possible to avoid discarding of the error packet for the monitoring path, so that the error packet for the monitoring path arrives at a path-switch node.

In the first case, the working path is established first, and then the backup path is established followed by the monitoring path. However, the order of establishment of the backup path and the monitoring path can be reversed, so that the monitoring path is established before the backup path. In the first case in which the backup path is established before the monitoring path, if the failure occurs before the monitoring path is established, there is a possibility that the traffic cannot be detoured from the working path to the backup path. However, if the monitoring path is established before the backup path, it is possible to detour the traffic from the working path to the backup path no matter when the failure occurs after the backup path is established.

Moreover, in the first case, the backup path is established only at a part of the working path, and the traffic is detoured from the working path to the backup path when the failure occurs at the part of the working path. However, it is not necessary to limit the establishment of the backup path only at the part of the working path. Instead, it is possible to establish the backup path at other part of the working path. In general, a plurality of backup paths is established to avoid a failure even when the failure occurs at any point on the working path.

When the error message is delivered to the start-point node of the monitoring path, if the PathErr/ResvTear message is used as the error message, the error message is transferred on the monitoring path by Hop-by-Hop. On the other hand, if the Notify message is used as the error message, the error message is directly transferred to the start-point node that is a destination for the packet. For this reason, the error message may be transferred through different path from the monitoring path.

In addition, the label table and the failure-recovery table are built in each of the apparatuses manually, without using the path-establishment signaling protocol to establish the working path, the backup path, and the monitoring path.

As the second case, a failure-recovery operation by the data relay apparatus 100 according to the present embodiment for a network configured with nine nodes will be explained with reference to FIGS. 10 to 13. First, a "working path 1" having a route of "node 1"→"node 2"→"node 3"→"node 4"→"node 5" and a "working path 2" having a route of "node 8"→"node 2"→"node 3"→"node 4"→"node 9" are established using the path-establishment signaling protocol (RSVP-TE).

To recover from a failure occurred at "node 2"-"node 3"-"node 4", a "backup path 1" and a "backup path 2" having a route of "node 2"→"node 6"→"node 7"→"node 4" with the "node 2" as a start point and the "node 4" as an end point are established. The "backup path 1" is used as a detour for the "working path 1", and the "backup path 2" is used as a detour for the "working path 2". The "backup path 1" and the "backup path 2" are established using the path-establishment signaling protocol (RSVP-TE), in the same manner as the working path.

The "node 2" that becomes a path-switch node at the time of a failure holds the failure-recovery table 170. In this example, the path IDs of the "working path 1" and the "working path 2" are "#1" and "#2", respectively, and the path IDs of the "backup path 1" and the "backup path 2" are "#10" and "#20", respectively.

The "working path 1" and the "working path 2" pass the same section ("node 2"-"node 3"-"node 4"). In order to monitor a failure occurs in this section, a monitoring path is established on the same route. To establish the monitoring path, the path-establishment signaling protocol (RSVP-TE) is used.

Figure 10:
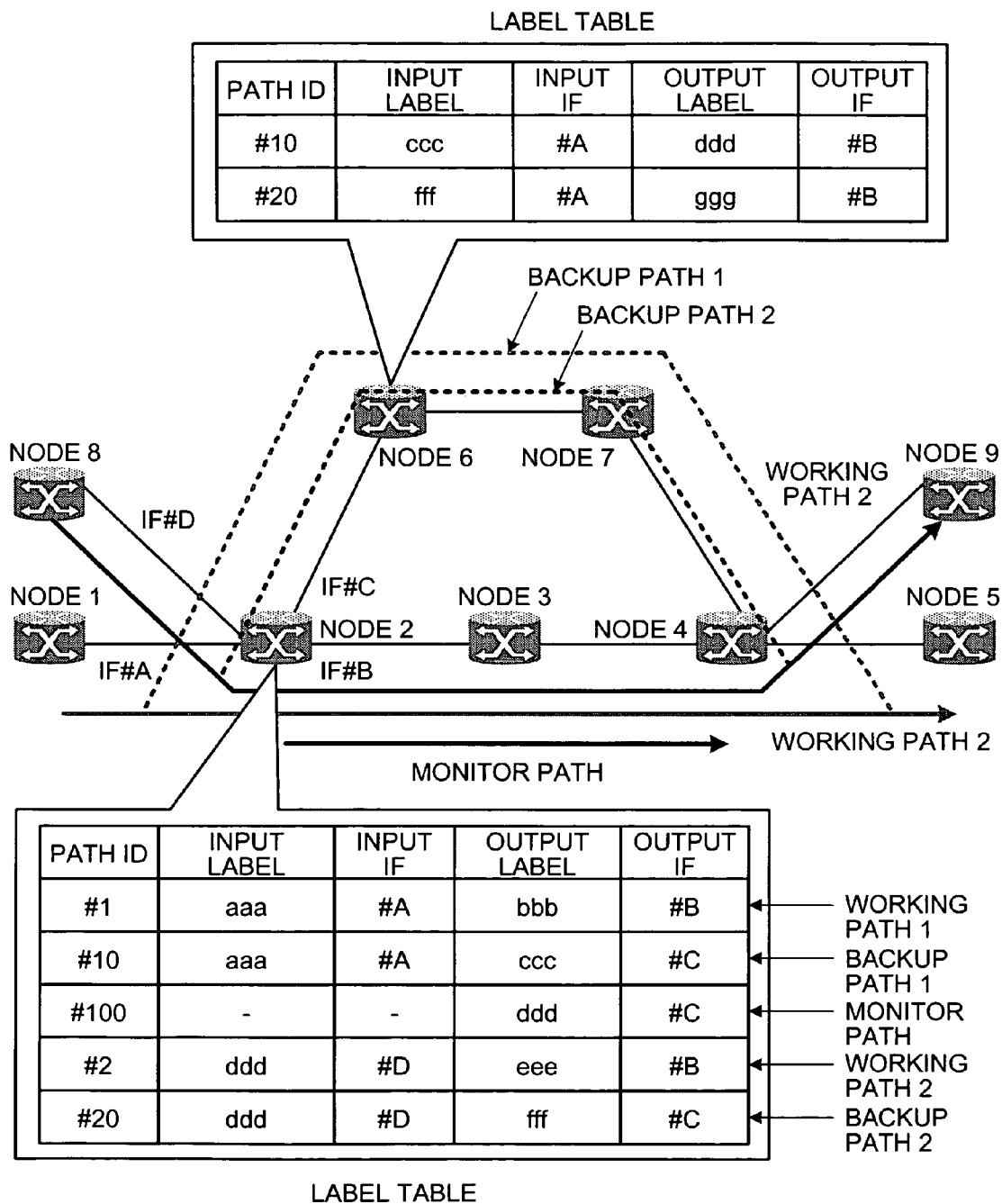
FIG. 10 is a first schematic diagram for illustrating an establishment of a working path, a backup path, and a monitoring path.
Figure 11:
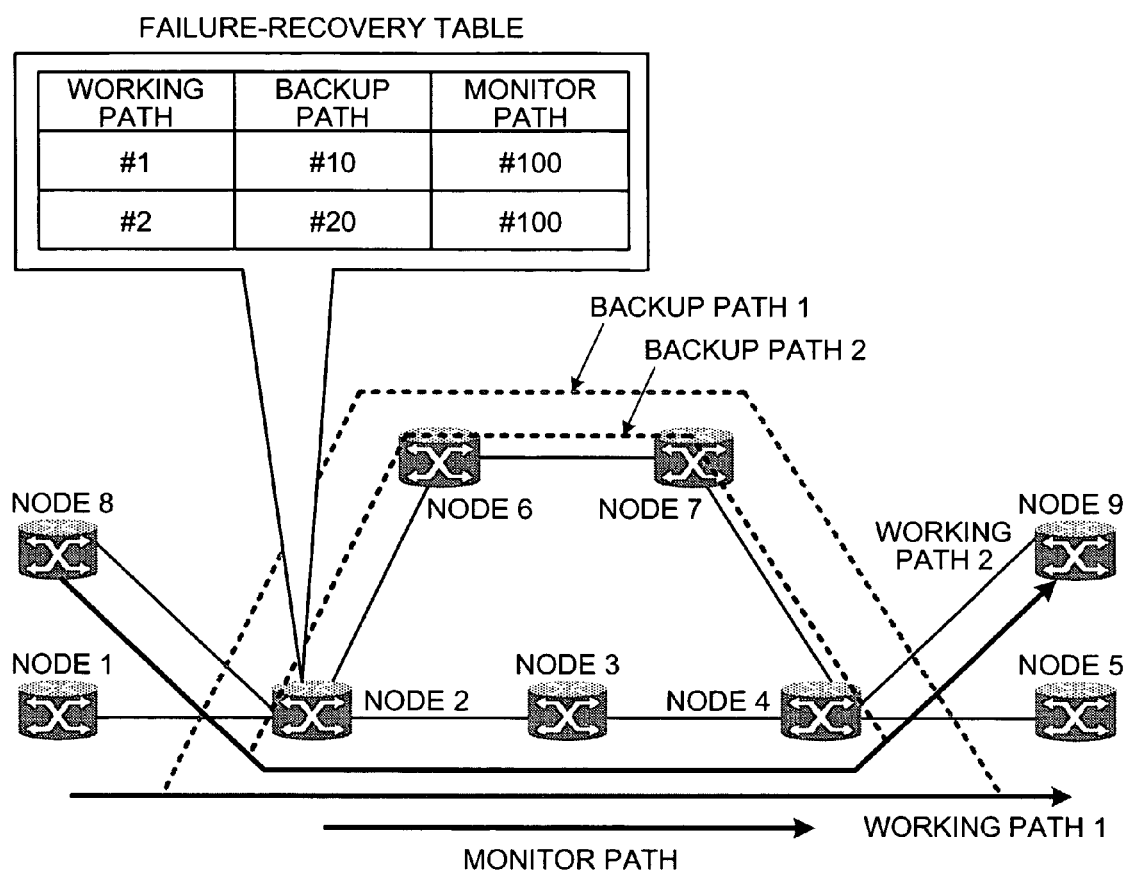
FIG. 11 is a second schematic diagram for illustrating a correspondence between a working path, a backup path, and a monitoring path.

The "working path 1", the "working path 2", the "backup path 1", "backup path 2", and the monitoring path are shown in FIG. 10. An example of the label table built with the path-establishment signaling protocol is also shown in FIG. 10.

The "node 2" that becomes a path-switch node at the time of a failure holds the failure-recovery table 170. In this example, when the path ID of the monitoring path is "#100", the failure-recovery table 170 becomes the one shown in FIG. 11.

Figure 12:
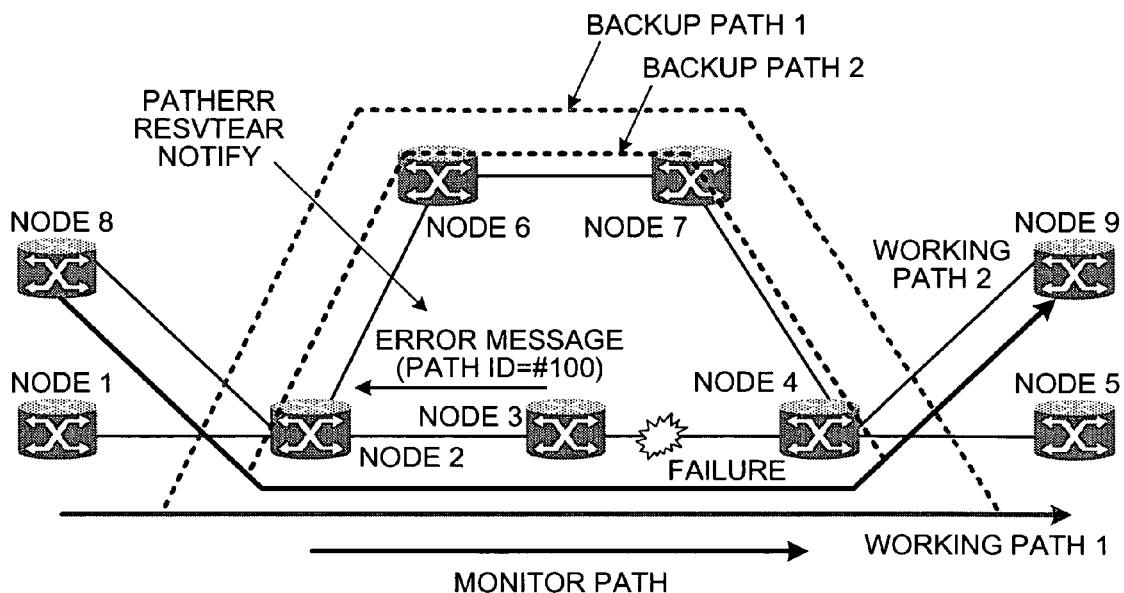
FIG. 12 is a second schematic diagram for illustrating a transmission of an error message at a time of a failure occurrence.

When a failure occurs between the "node 2"-"node 3"-"node 4", a data relay apparatus on an upstream side detects the failure. In this example, the failure is occurs between the "node 3"-"node 4". The "node 3" that detected the failure transmits an error message with respect to a monitoring path to the "node 2" to notify the path-switch "node 2" that the failure has occurred. A path ID of the monitoring-path is stored in the error message with respect to the monitoring path (FIG. 12).

Figure 13:
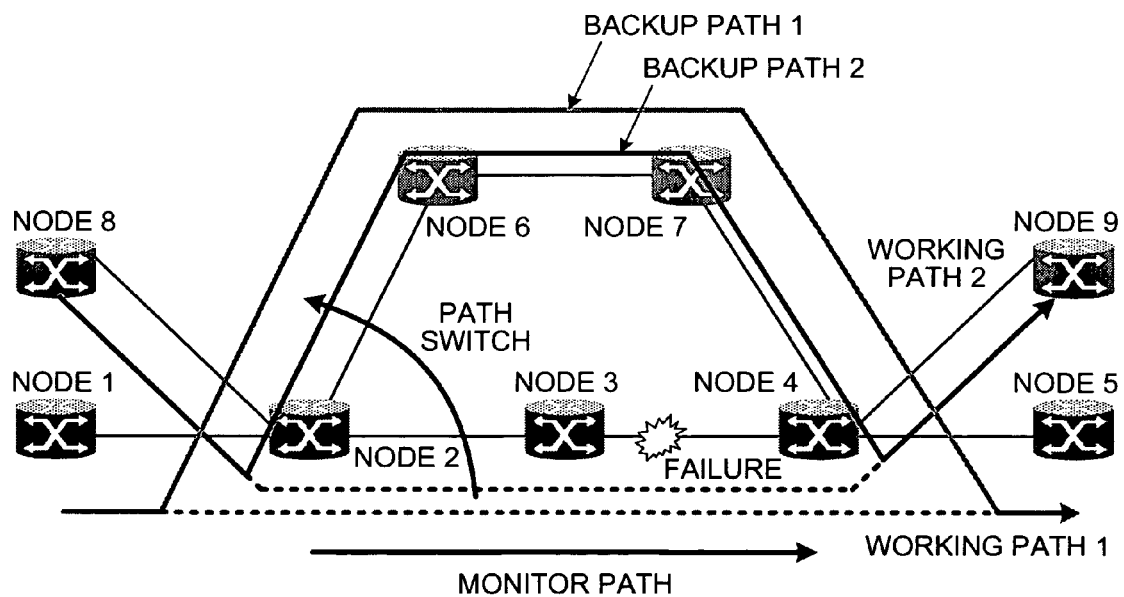
FIG. 13 is a second schematic diagram for illustrating a path switch for taking a detour around a failure.

The "node 2" receives the error message, searches the failure-recovery table 170 based on the path ID stored n the error message, and identifies the working path and the backup path. In the second case, two sets of the working path and the backup path are obtained. Then, the "node 2" recovers from the failure by transferring the traffic on the working path obtained to the corresponding backup path. As a result, it is possible to recover two working paths affected from the failure with a reception of the error message with respect to one monitoring path (FIG. 13).

In this manner, by using the data relay apparatus 100 according to the present embodiment, it is possible to set one monitoring path for a plurality of working paths, and to reduce the number of monitoring paths. Furthermore, it is possible to reduce the error message created at the time of a failure.

Subsequently, as the third case, a failure-recovery operation by the data relay apparatus 100 according to the present embodiment for a network configured with nine nodes will be explained with reference to FIGS. 14 to 17. First, a "working path 1" having a route of "node 1"→"node 2"→"node 3"→"node 4"→"node 5" and a "working path 2" having a route of "node 8"→"node 2"→"node 3"→"node 4"→"node 9" are established using the path-establishment signaling protocol (RSVP-TE).

To recover from a failure occurred at "node 2"-"node 3"-"node 4", a Bypass tunnel having a route of "node 2"→"node 6"→"node 7"→"node 4" with the "node 2" as a start point and the "node 4" as an end point is established. The Bypass tunnel is established using the path-establishment signaling protocol (RSVP-TE), in the same manner as the working path.

At the time of a failure, the route of the working path is replaced with the Bypass tunnel. In addition, the traffic transferred on the Bypass tunnel includes a Bypass-tunnel label attached in front of the working path label. The "node 2" attaches the label used by the "node 4" before the failure to the traffic as a current label, so that the "node 4" can transfer the traffic transferred through the Bypass tunnel to the working path.

In addition, the "node 2" that becomes a path-switch node at the time of a failure holds the failure-recovery table 170 that is a table for associating the working path and the backup path. In this example, the path IDs of the "working path 1" and the "working path 2" are "#1" and "#2", respectively, and the path ID of the Bypass tunnel is "#1000".

The "working path 1" and the "working path 2" pass the same section ("node 2"-"node 3"-"node 4"). In order to monitor a failure occurs in this section, a monitoring path is established on the same route. To establish the monitoring path, the path-establishment signaling protocol (RSVP-TE) is used.

Furthermore, to indicate that the path established is the monitoring path, when the path-establishment signaling protocol is carried out, information, such as a flag or an object indicating that the path is the monitoring path, is implanted, or a path ID indicating that the path is the monitoring path is assigned.

Figure 14:
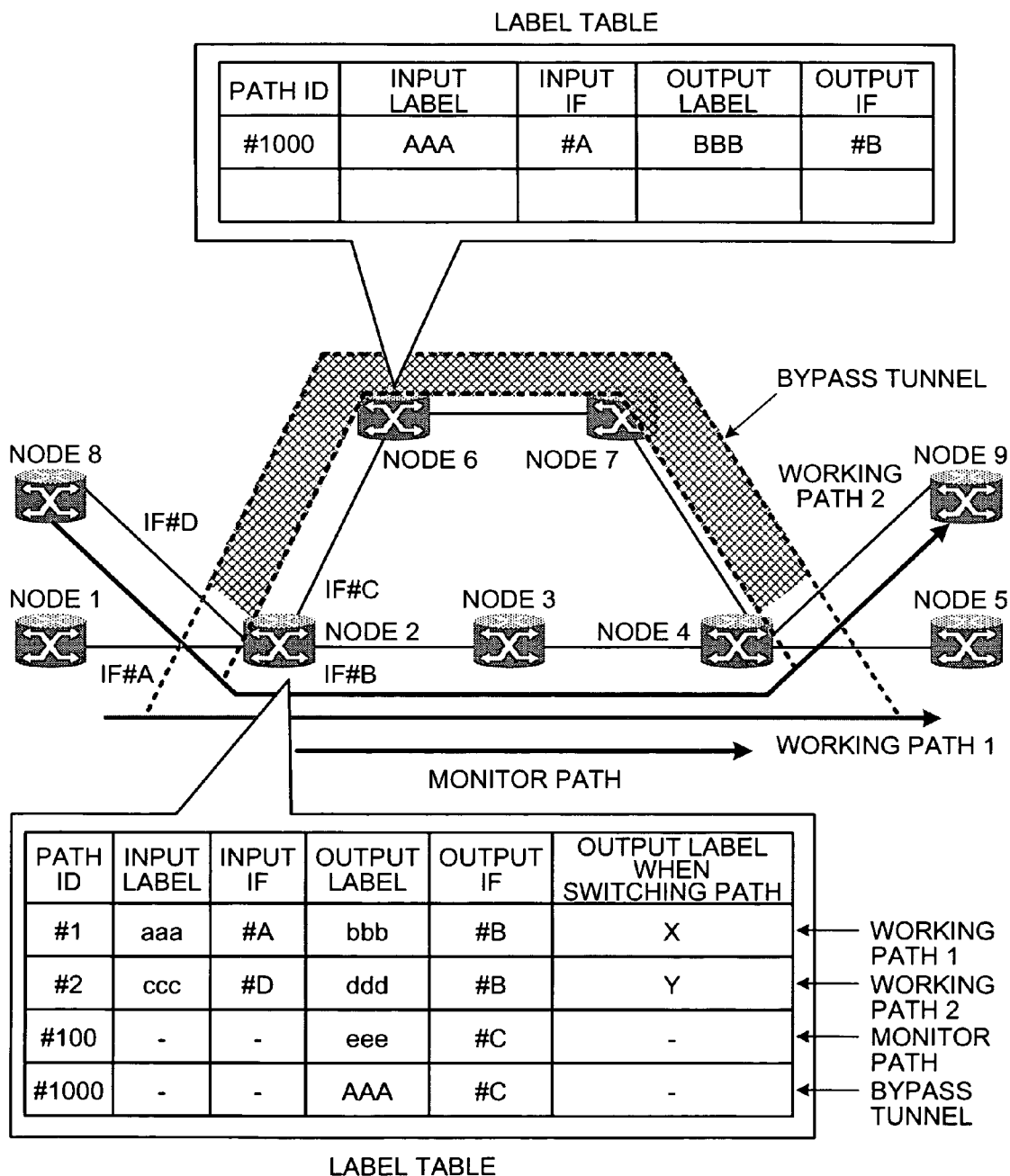
FIG. 14 is a schematic diagram for illustrating an establishment of a working path, a Bypass tunnel, and a monitoring path.

The "working path 1", the "working path 2", the Bypass tunnel, and the monitoring path established are shown in FIG. 14. In addition, an example of the label table built with the path-establishment signaling protocol is also shown in FIG. 14.

Figure 15:
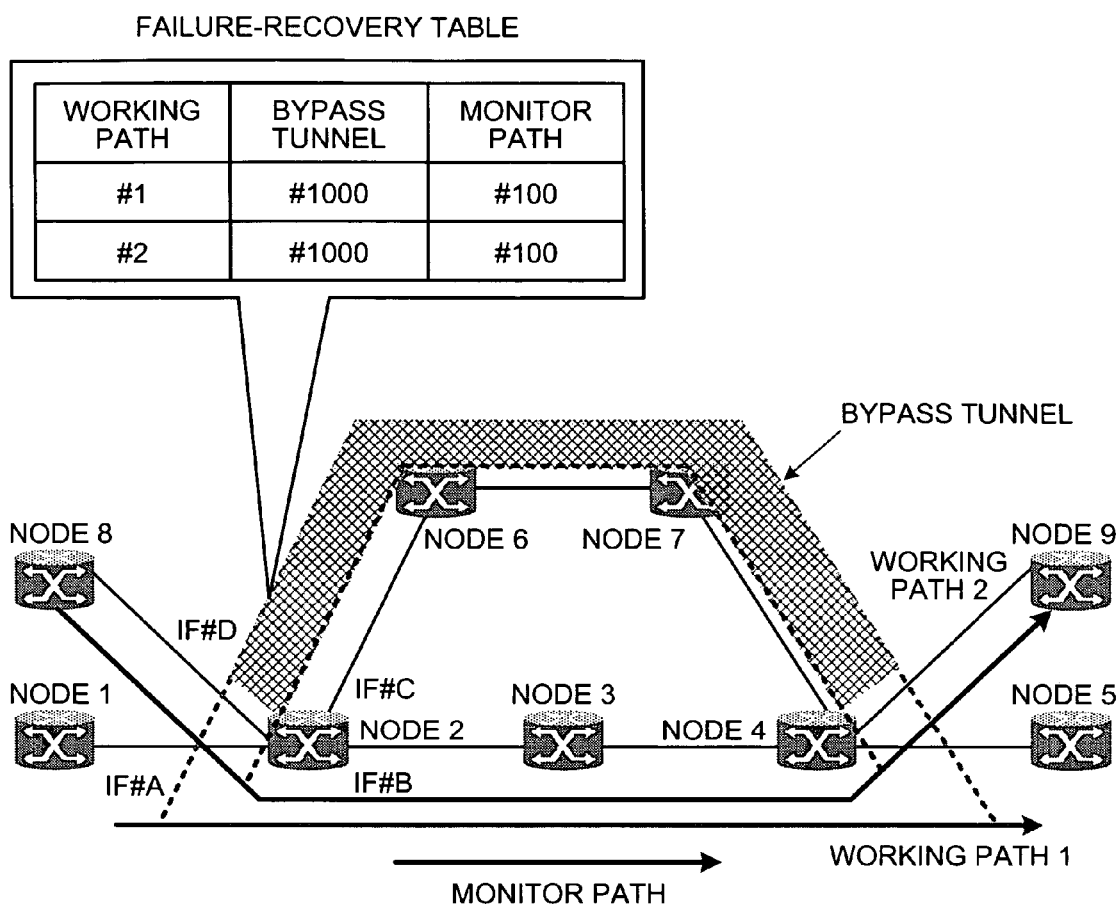
FIG. 15 is a schematic diagram for illustrating a correspondence between a working path, a Bypass tunnel, and a monitoring path.

The "node 2" that becomes a path-switch node at the time of a failure holds the failure-recovery table 170 that is a table for associating the Bypass tunnel and the monitoring path (FIG. 15). In this example, the path ID of the monitoring path is "#100".

Figure 16:
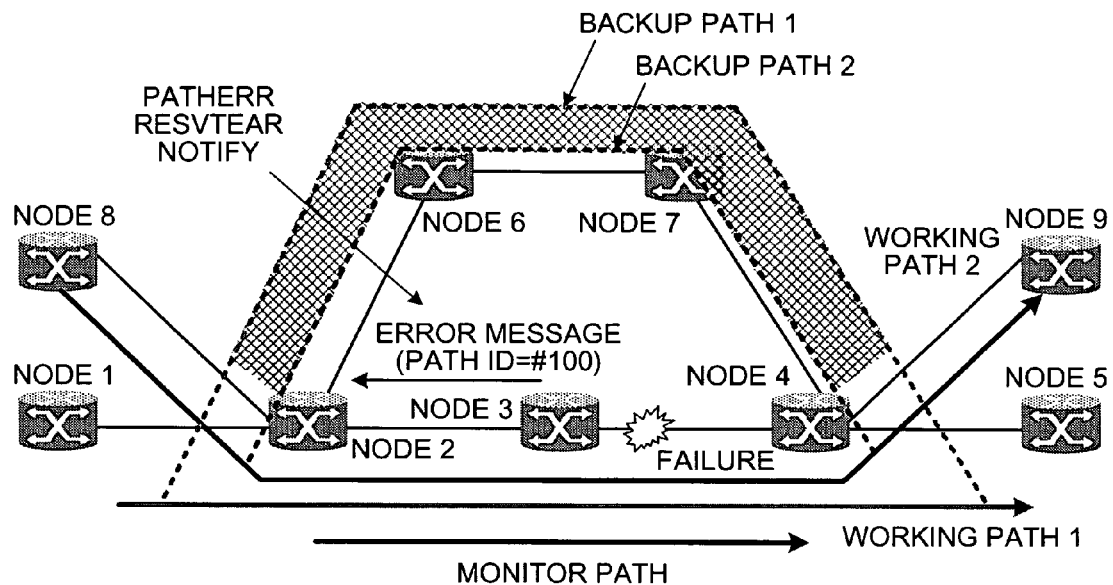
FIG. 16 is a third schematic diagram for illustrating a transmission of an error message at a time of a failure occurrence.

When a failure occurs between the "node 2"-"node 3"-"node 4", a relay node at an upstream detects the failure. In this example, there is a failure between the "node 3"-"node 4". Then, the "node 3" that detected the failure transmits an error message with respect to the monitoring path to the "node 2", to notify that the failure has occurred to the path-switch node "node 2" (FIG. 16). In the error message with respect to the monitoring path, a monitoring-path ID is included.

The "node 2" that received the error message searches the failure-recovery table 170, based on the path ID stored in the error message, and identifies the working path and the Bypass tunnel. In the third case, two sets of the working path and the Bypass tunnel are obtained. Then, the working path obtained is replaced with the Bypass tunnel.

Figure 17:
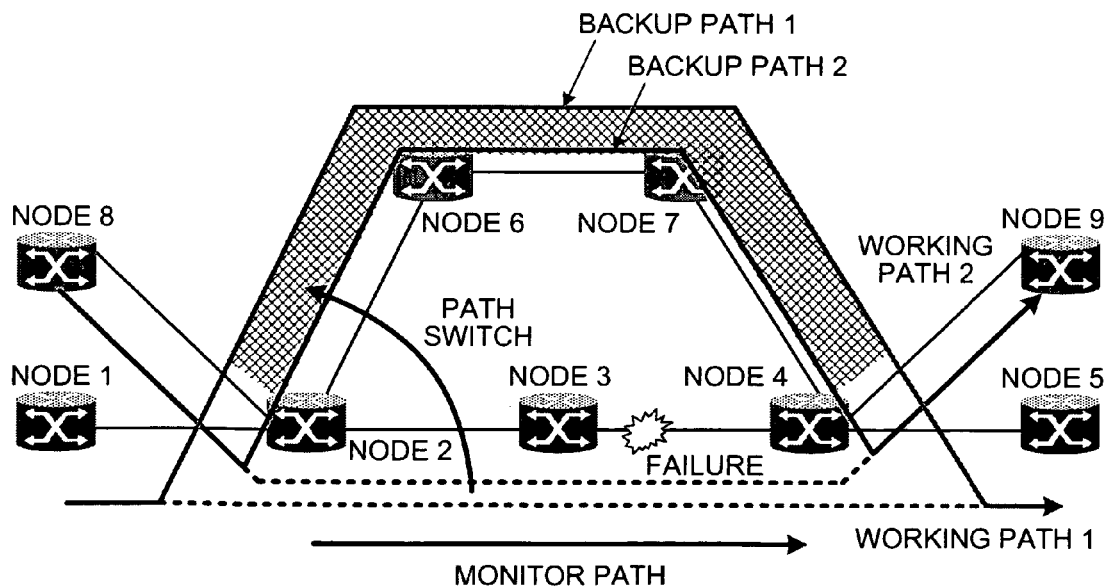
FIG. 17 is a third schematic diagram for illustrating a path switch for taking a detour around a failure.

An output label used at the time of a failure is attached to the traffic. The traffic is further attached with a Bypass-tunnel label, and transferred to the Bypass tunnel. With this mechanism, it is possible to recover from the failure (FIG. 17). As a result, it is possible to recover two working paths affected from the failure with a reception of the error message with respect to one monitoring path.

In this manner, by using the data relay apparatus 100 according to the present embodiment, it is possible to set one monitoring path for a plurality of working paths, and to reduce the number of monitoring paths. Furthermore, it is possible to reduce the error message created at the time of a failure.

In the explanation so far, a case in which the start point and the end point of the backup path are the same as those of the monitoring path has been explained. However, it is also possible to set the start point and the end point of the backup path and the start point and the end point of the monitoring path differently. As the fourth case, the case in which the end point of the backup path is different from the end point of the monitoring path is explained with reference to FIG. 18.

Figure 18:
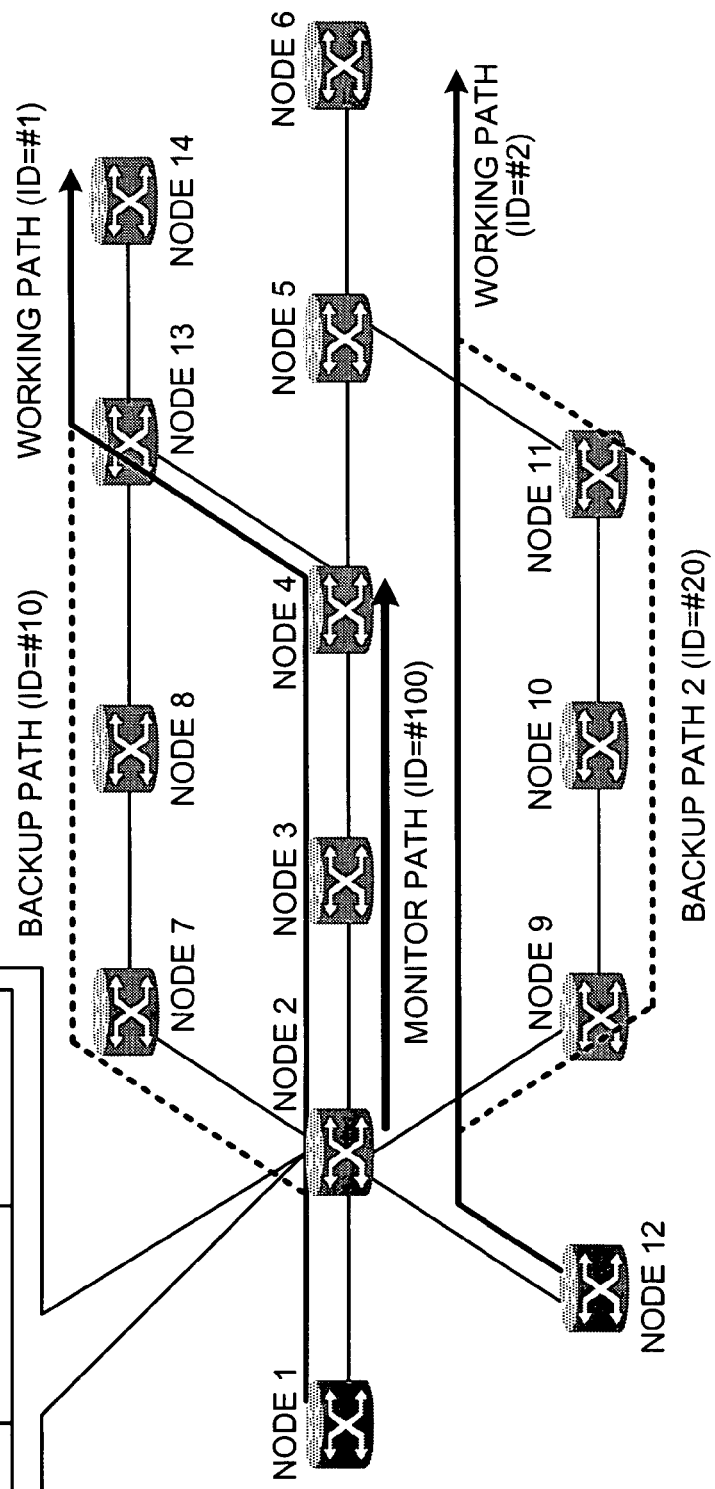
FIG. 18 is a schematic diagram for illustrating a monitoring path corresponding to a plurality of backup paths in different detour sections (part 1)

First, a "working path 1" having a route of "node 1"→"node 2"→"node 3"→"node 4"→"node 13"→"node 14" and a "working path 2" having a route of "node 12"→"node 2"→"node 3"→"node 4"→"node 5"→"node 6" are established (FIG. 18).

The "working path 1" and the "working path 2" pass the same section "node 2"-"node 3"-"node 4". A backup path to take a detour around a failure occurred in this section is established. "The backup path 1" corresponding to the "working path 1" is established with a route "node 2"→"node 7"→"node 8"→"node 13", and the "backup path 2" corresponding to the "working path 2" is established with a route "node 2"→"node 9"→"node 10"→"node 11"→"node 5".

Furthermore, in the fourth case, because it is not necessary to make the end point of the backup path and the end point of the monitoring path the same, a monitoring path is established for monitoring a failure occurs at the section "node 2"-"node 3"-"node 4" through which both the "working path 1" and the "working path 2" pass.

The "node 2" registers the monitoring path, the "backup path 1", and the "backup path 2" in the failure-recovery table 170, in association with each other. In this example, the path IDs of the "working path 1" and the "working path 2" are "#1" and "#2", respectively, and the path IDs of the "backup path 1" and the "backup path 2" are "#10" and "#20", respectively. The path ID of the monitoring path is "#100".

When a failure occurs between the "node 2"-"node 3"-"node 4", a data relay apparatus on an upstream side detects the failure. In this example, the failure is occurs between the "node 3"-"node 4". The "node 3" that detected the failure transmits an error message with respect to a monitoring path to the "node 2" to notify the path-switch "node 2" that the failure has occurred. A path ID of the monitoring-path is stored in the error message with respect to the monitoring path.

The "node 2" receives the error message, searches the failure-recovery table 170 based on the path ID stored in the error message, and identifies the working path and the backup path. In the fourth case, two sets of the working path and the backup path are obtained. Then, the "node 2" recovers from the failure by transferring the traffic on the working path obtained to the corresponding backup path. As a result, it is possible to recover two working paths affected from the failure with a reception of the error message with respect to one monitoring path.

In this manner, by using the data relay apparatus 100 according to the present embodiment, it is possible to manage a plurality of backup paths to take a detour around different sections with one monitoring path, and to reduce the number of monitoring paths.

In the fourth case, the backup path is established with respect to a part of sections of the working path, and the traffic is detoured only when a failure occurs at the part of sections. However, it is not limited to establish the backup path only for the part of sections, but the backup path can be established for other sections according to a necessity. In other words, in the above explanation, a part of the network is picked up to make the explanation simple.

Although the detour path that can be set regarding to the "working path 1" is "node 2"-"node 3"-"node 4"-"node 13" in the fourth case, another detour path can be established for other sections in an actual network. For example, when there is a link between "node 14"-"node 5", a "backup path 1'" can be established to take a detour around "node 4"-"node 13"-"node 14".

In this kind of case, it is possible to establish a monitoring path between the "node 4"-"node 13"-"node 14", and apply a similar failure-recovery mechanism. In this manner, by making it possible to establish a detour path with respect to all links of the working path, it is possible to protect the whole working path from the failure.

Figure 19:
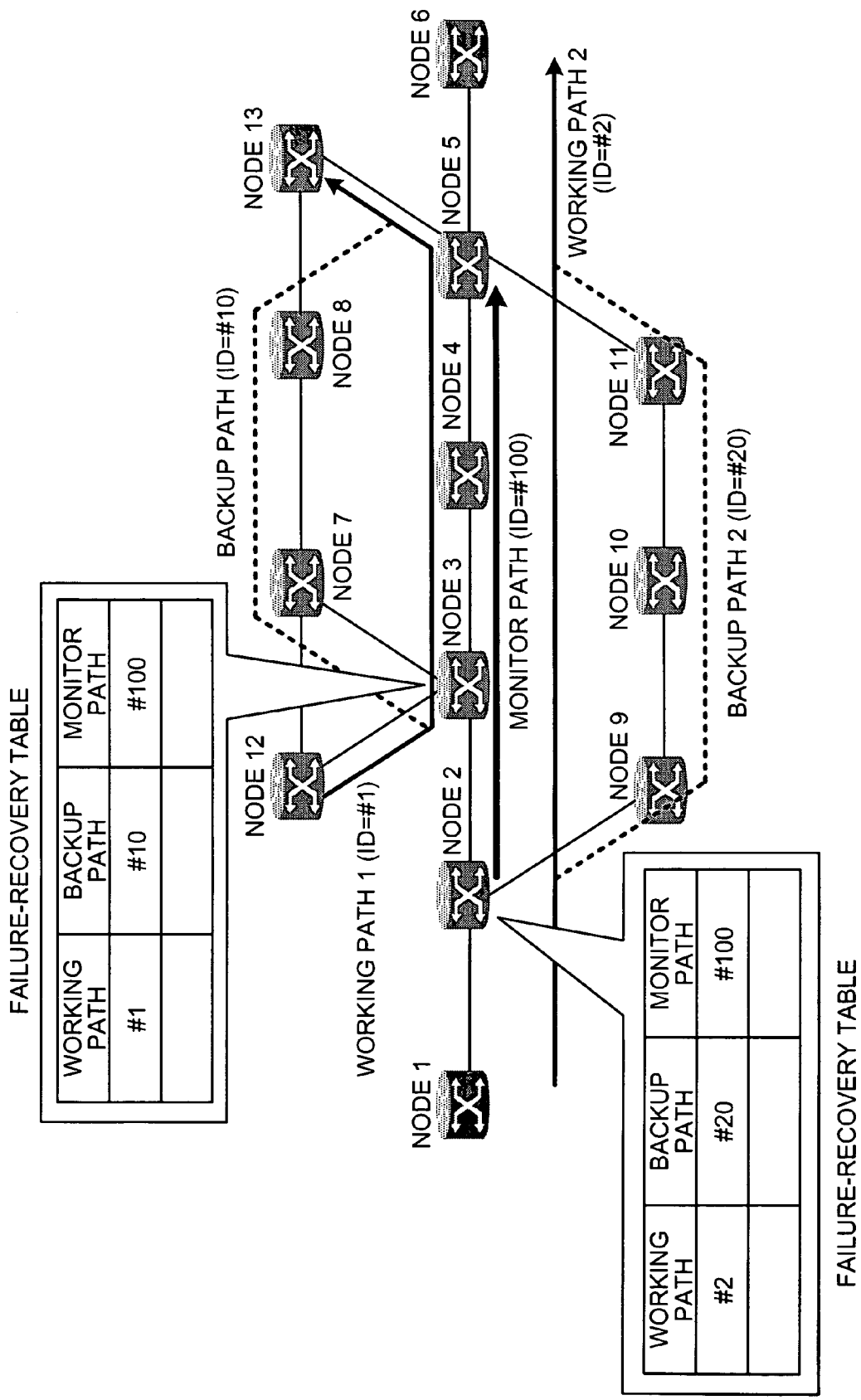
FIG. 19 is a schematic diagram for illustrating a monitoring path corresponding to a plurality of backup paths in different detour sections (part 2)

In the explanation so far, a method of establishing monitoring path at a common section of a plurality of working paths and associating the monitoring path with the backup path has been explained. However, it is also possible to establish a monitoring path at other sections than the common section of the working paths. As the fifth case, a method of reducing the number of the monitoring paths by associating the monitoring path established at a section bigger than the common section in a direction of the upstream with the backup path is explained with reference to FIG. 19.

First, a "working path 1" having a route of "node 12"→"node 3"→"node 4"→"node 5"→"node 13" and a "working path 2" having a route of "node 1"→"node 2"→"node 3"→"node 4"→"node 5"→"node 6" are established. It is assumed that a "backup path 1" and a "backup path 2" corresponding to the "working path 1" and the "working path 2", respectively, are established.

At this moment, a monitoring path including both sections around which the "backup path 1" and the "backup path 2" take a detour is established at "node 2"→"node 3"→"node 4"→"node 5". The "node 2"→"node 3"→"node 4"→"node 5" where the monitoring path is established is a bigger section than the "working path 1" and the "working path 2" in a direction of the upstream side. For this reason, a start-point node of the monitoring path and start-point nodes of all of the backup paths are not the same.

In this example, the path IDs of the "working path 1" and the "working path 2" are "#1" and "#2", respectively, and the path IDs of the "backup path 1" and the "backup path 2" are "#10" and "#20", respectively. The path ID of the monitoring path is "#100". The "node 2" that is a start-point node of the "backup path 2" associates the "backup path 2" with the monitoring path, and registers a result of the association in the failure-recovery table 170. Furthermore, the "node 3" that is a start-point node of the "backup path 1" associates the "backup path 1" with the monitoring path, and registers a result of the association in the failure-recovery table 170.

When a failure occurs between the "node 2"-"node 3"-"node 4"-"node 5", a data relay apparatus on an upstream side detects the failure. In this example, the failure is occurs between the "node 4"-"node 5". The "node 4" that detected the failure transmits an error message with respect to a monitoring path to the "node 2" to notify the path-switch "node 2" that the failure has occurred. In this example, a PathErr/Resv err message is used for the error message.

In this case, because the error message is transferred on the monitoring path by Hop-by-Hop, all the nodes on the monitoring path on a side of the upstream than the transmission node of the error message (in this case, the "node 3" that is the relay node and the "node 2" that is the start-point node) become to be able to handle the error message.

The "node 2" and the "node 3" that relayed the error message searches the failure-recovery table 170 based on the path ID stored in the error message, and identifies the working path and the backup path. The "working path 2" and the "backup path 2" are obtained from the "node 2", and the "working path 1" and the "backup path 1" are obtained from the "node 3".

Then, a recovery from the failure is performed by transferring the traffic on the working path obtained to the corresponding backup path.

In this manner, by using the data relay apparatus 100 according to the present embodiment, it is possible to detour the traffic of a plurality of backup paths having different sections with an error message with respect to one monitoring path, and to reduce the number of monitoring paths.

Figure 20:
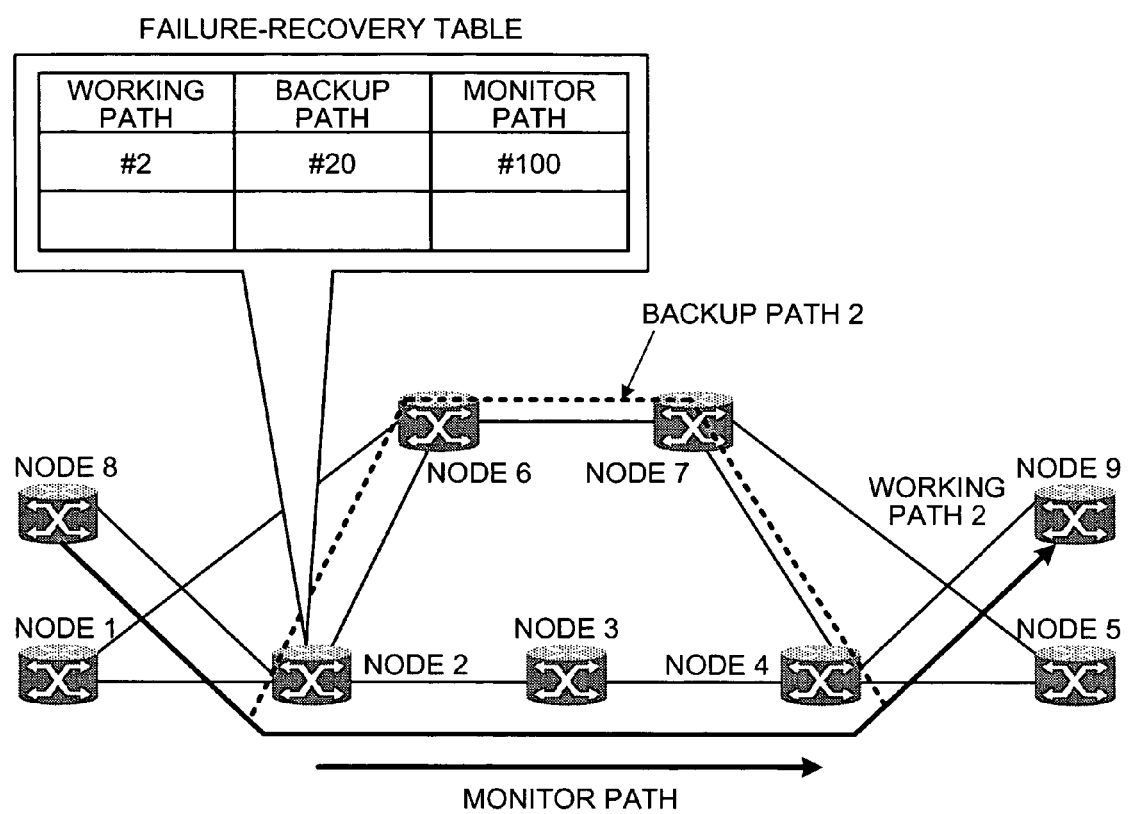
FIG. 20 is a schematic diagram for illustrating established working path, backup path, and monitoring path.

As the sixth case, a case in which a path from the "node 1" to the "node 5" is newly added when a set of the "working path 2" and the "backup path 2", and a monitoring path are already established, as shown in FIG. 20, will be explained. When the "node 1" calculates a route from the "node 1" to the "node 5", it calculates a path that reduces the number of monitoring paths in the whole network, by sharing the monitoring path already established.

Figure 21:
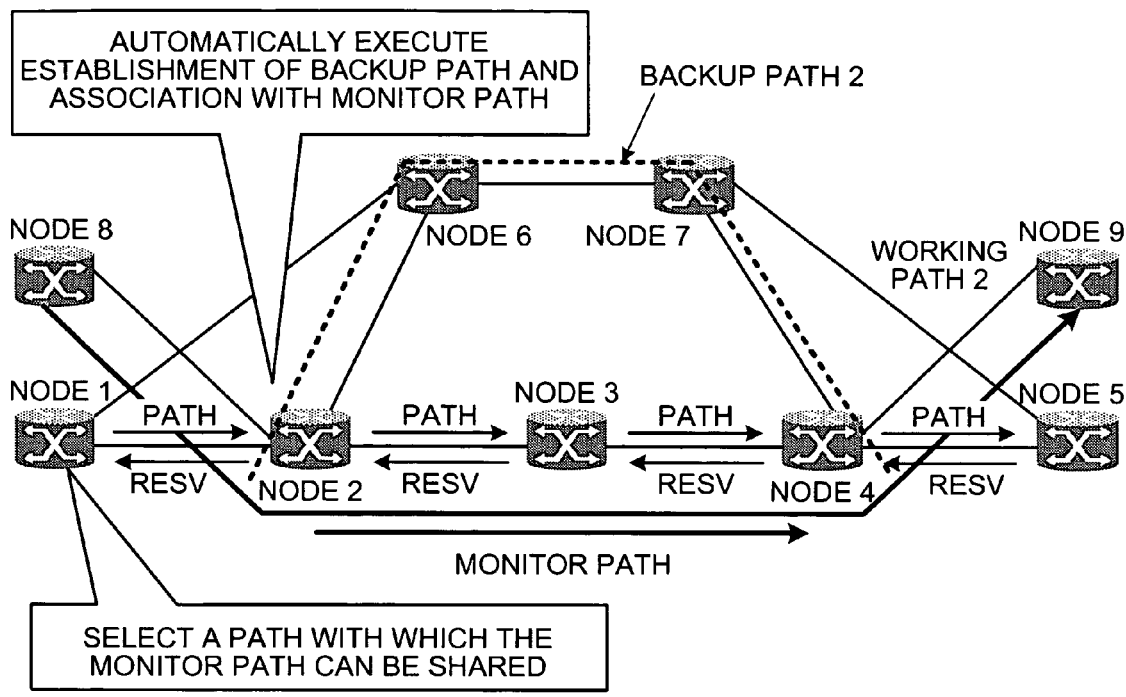
FIG. 21 is a schematic diagram for illustrating an addition of a working path.

In the example shown in FIG. 20, although the shortest route is "node 1"→"node 6"→"node 7"→"node 5", the "node 1" selects "node 1"→"node 2"→"node 3"→"node 4"→"node 5" (FIG. 21). Then, the "node 1" establishes a "working path 1" having a route of "node 1"→"node 2"→"node 3"→"node 4"→"node 5", using the path-establishment signaling protocol (RSVP-TE).

At this moment, upon recognizing that the "working path 1" passes the same route as the monitoring path already established, the "node 2" establishes a "backup path 1" from the "node 2" that is a start-point node of the monitoring path to the "node 4" that is and an end-point node of the monitoring path at a route of "node 2"→"node 6"→"node 7"→"node 4". The "backup path 1" corresponding to the "working path 1", and the monitoring path are registered in the failure-recovery table 170.

Figure 22:
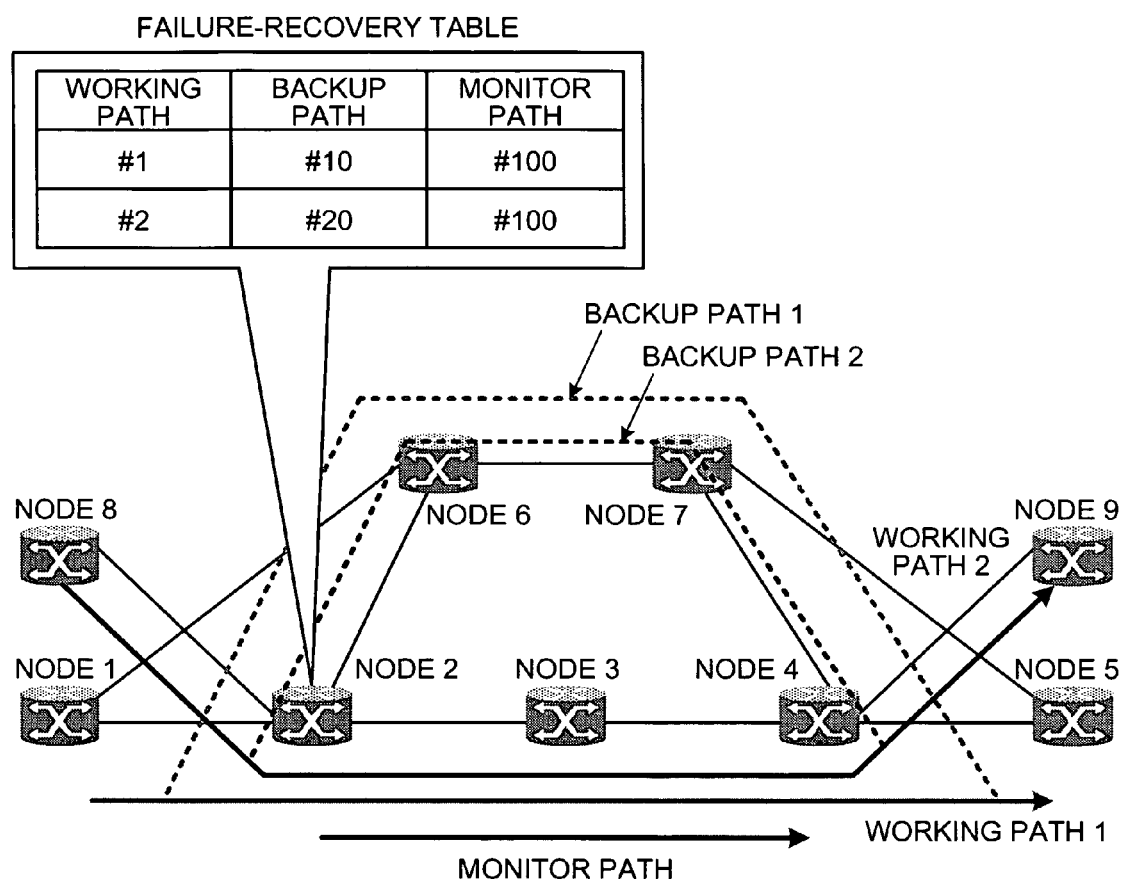
FIG. 22 is a third schematic diagram for illustrating a correspondence between a working path, a backup path, and a monitoring path.

In this example, the path IDs of the "working path 1" and the "working path 2" are "#1" and "#2", respectively, and the path IDs of the "backup path 1" and the "backup path 2" are "#10" and "#20", respectively. If the path ID of the monitoring path is "#100", the failure-recovery table 170 becomes the one shown in FIG. 22.

In this manner, when selecting a route, it is possible to reduce the number of monitoring paths in the whole network, by selecting a route that shares the same monitoring path. In addition, because the association of the working path, the backup path, and the monitoring path is carried out automatically at the time of establishing a path, it is possible to complete a setting of the path in a short time.

So far, a case in which the error message is transferred using the monitoring path, however, it is also possible to recover a failure of a plurality of paths with a single error message. As the seventh case, an operation of a failure recovery without using a monitoring path is explained for a network having nine nodes, with reference to FIGS. 23 to 27.

First, two working paths are established by using the path-establishment signaling protocol (RSVP-TE). One of the two paths is a "working path 1" with a route of "node 1"→"node 2"→"node 3"→"node 4"→"node 5"; and the other is a "working path 2" with a route of "node 8"→"node 2"→"node 3"→"node 4"→"node 9".

To recover from a failure occurred at "node 2"-"node 3"-"node 4", a "backup path 1" and a "backup path 2" with a route "node 2"→"node 6"→"node 7"→"node 4" with the "node 2" as a start point and the "node 4" as an end point are established. The "backup path 1" is used as a detour for the "working path 1", and the "backup path 2" is used as a detour for the "working path 2". The "backup path 1" and the "backup path 2" are also established by using the path-establishment signaling protocol (RSVP-TE), like the working path.

Figure 23:
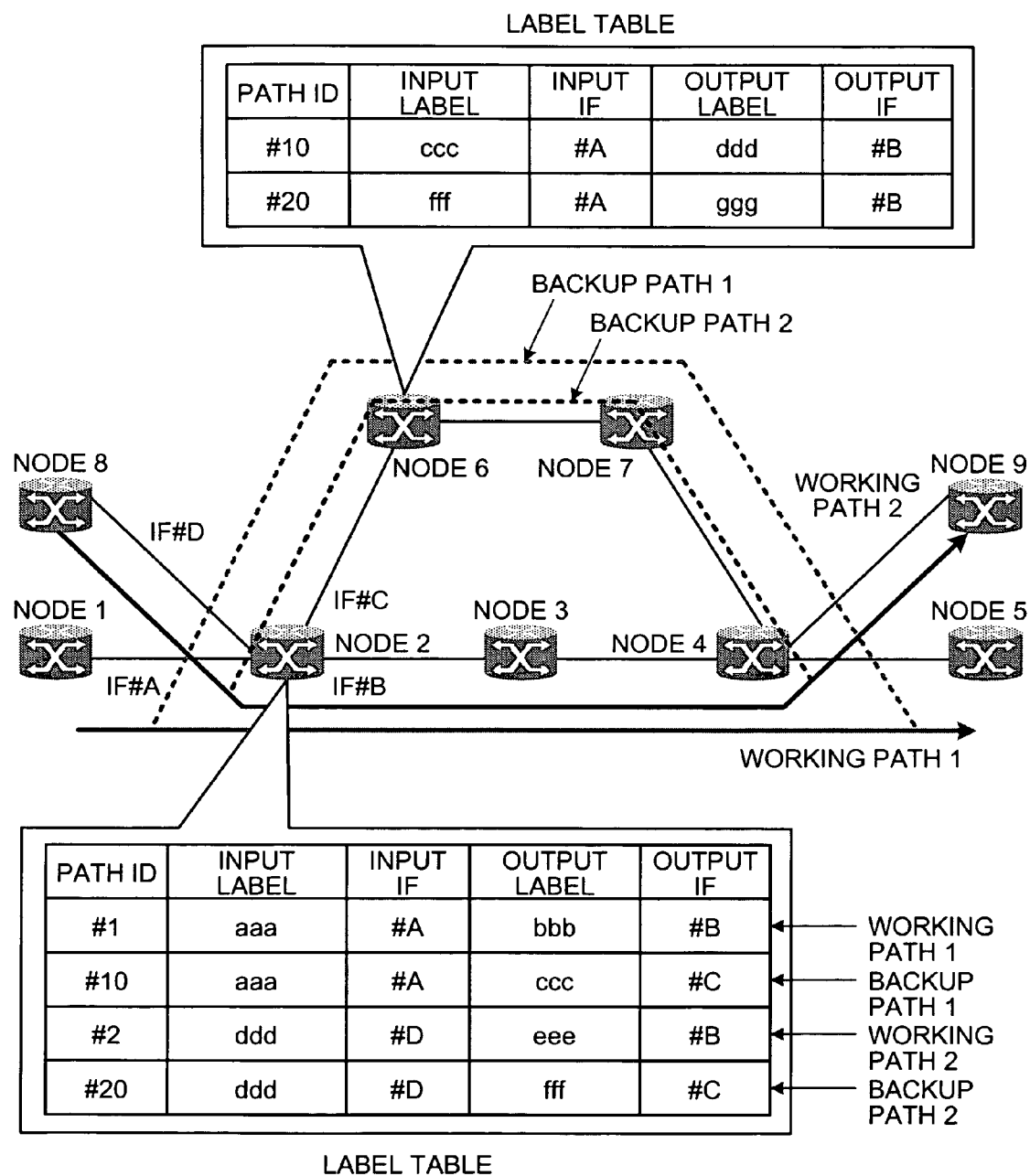
FIG. 23 is a first schematic diagram for illustrating an establishment of a working path and a backup path.
Figure 24:
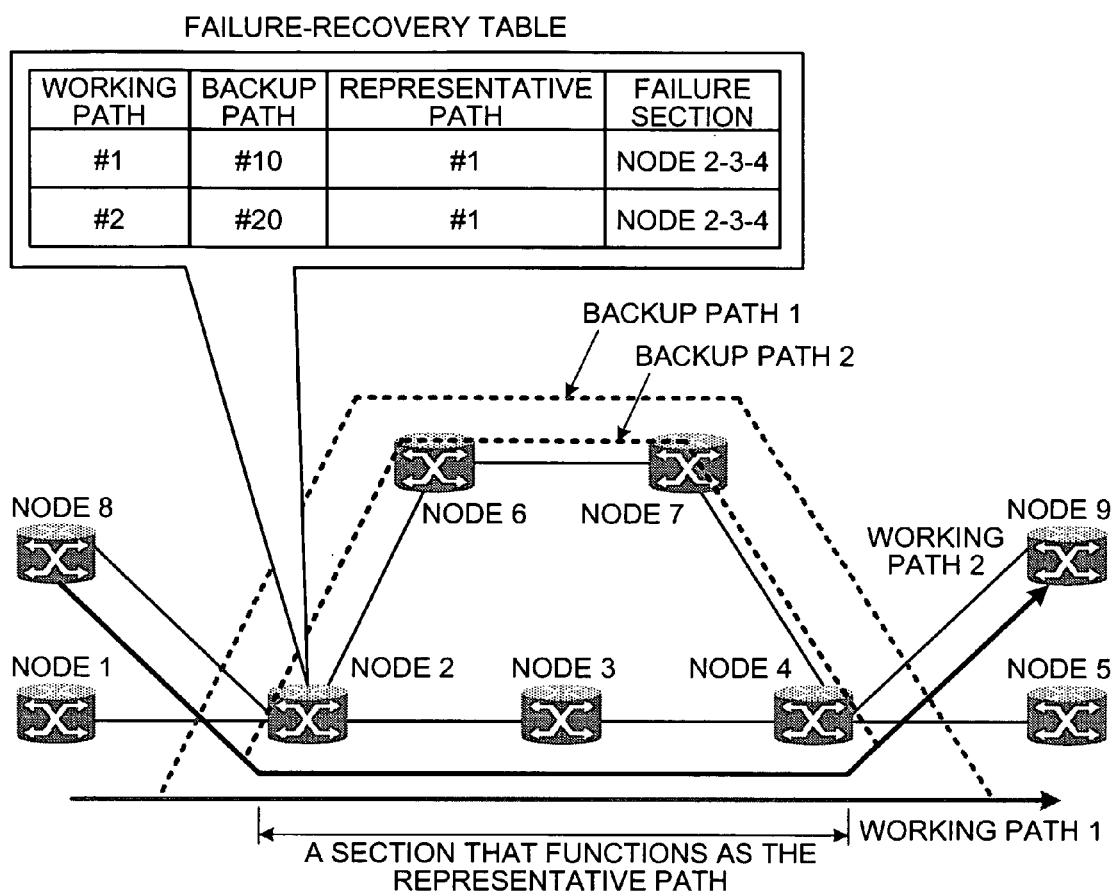
FIG. 24 is a schematic diagram for illustrating an establishment of a working path, a backup path, and a representative path.

The "working path 1", the "working path 2", the "backup path 1", "backup path 2" established are shown in FIG. 23. An example of the label table built with the path-establishment signaling protocol is also shown in FIG. 23.

The "working path 1" and the "working path 2" pass the same section ("node 2"-"node 3"-"node 4"). Therefore, when a failure occurs in this section, both the "working path 1" and the "working path 2" are switched over to the backup path to take a detour for the traffic.

In the previous cases, a monitoring path has been established with respect to the common section. However, in this example, one of the working paths is defined as a representative path instead of establishing a monitoring path (FIG. 24), and the error message is transferred using the representative path.

In this case, when establishing the working path as the representative path, a representative flag and start-point information and end-point information of the section, which indicates that the working path becomes the representative path in which section, are stored in the PATH message of the path-establishment signaling protocol (RSVP-TE). For example, the "node 2" that is a start-point node ID and the "node 4" that is an end-point node ID are stored as the section in which the working path becomes the representative path.

The "node 2" that becomes a path-switch node at the time of a failure holds the failure-recovery table, as shown in FIG. 25, which is a table for associating the backup path and the representative path. A working path ID, a backup-path ID, a representative-path ID, and a failure section are registered in the failure-recovery table, in association with each other. In this example, the path IDs of the "working path 1" and the "working path 2" are "#1" and "#2", respectively, the "backup path 1" and the "backup path 2" are "#10" and "#20", respectively, and the "working path 1" is the representative path.

Figure 26:
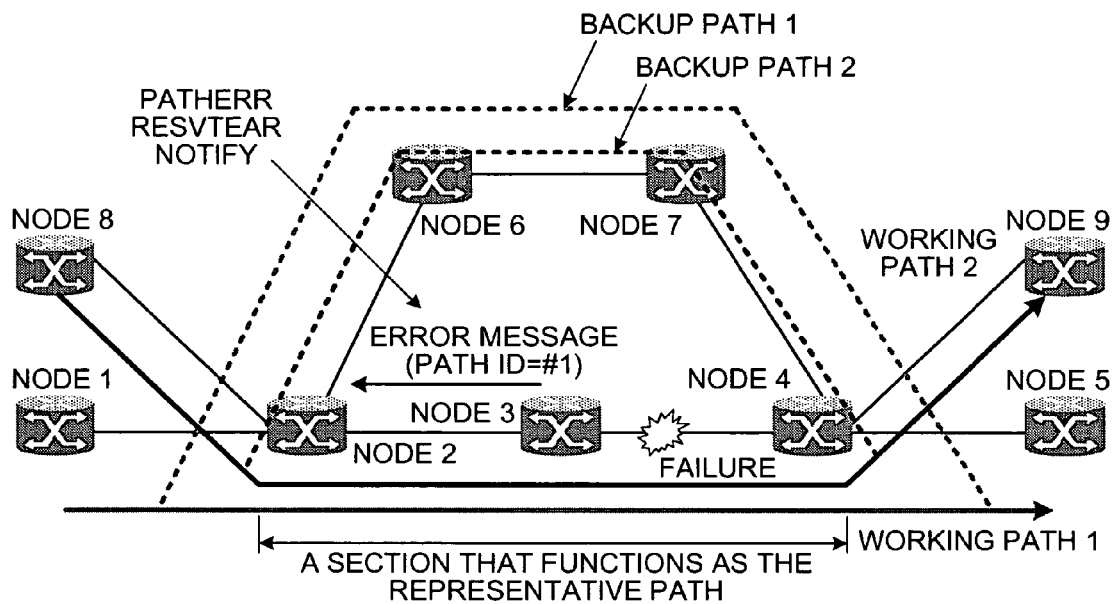
FIG. 26 is a fourth schematic diagram for illustrating a transmission of an error message at a time of a failure occurrence.

When a failure occurs between the "node 2"-"node 3"-"node 4", a relay node at an upstream detects the failure. In this example, there is a failure between the "node 3"-"node 4". Then, the "node 3" that detected the failure transmits an error message with respect to the representative path to the "node 2", prior to other error messages, to notify that the failure has occurred to the path-switch node "node 2". Alternatively, the "node 3" transmits the error message with respect to only the representative path to the "node 2". In the error message, a path ID of the representative path and an address of a failure point are included (FIG. 26).

Figure 27:
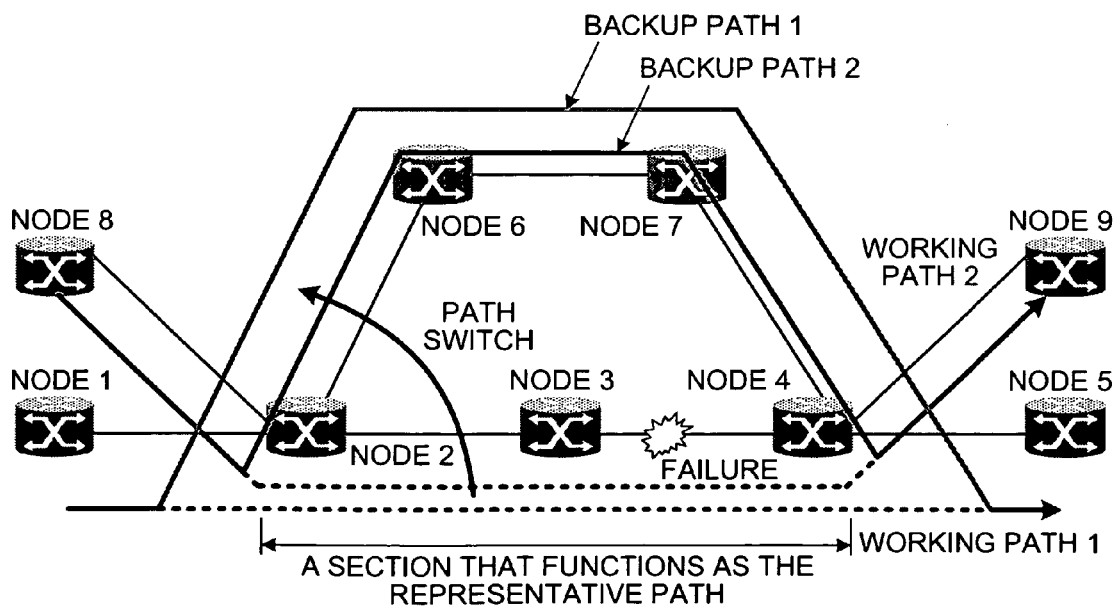
FIG. 27 is a fourth schematic diagram for illustrating a path switch for taking a detour around a failure.

The "node 2" that received the error message searches the failure-recovery table, based on the path ID and the address of the failure point stored in the error message, and identifies the working path and the backup path. In this case, two sets of the working path and the backup path are obtained. Then, by transferring the traffic on the working path obtained to the corresponding backup path, it is possible to recover from the failure. As a result, it is possible to recover two working paths affected from the failure with a reception of the error message with respect to one representative path (FIG. 27).

In this manner, by using the representative path, it is possible to realize a failure recovery of a plurality of paths by one error message without establishing a new monitoring path.

As the eighth case, a case in which neither the monitoring path nor the representative path is used is explained with reference to FIGS. 28 to 33. First, two working paths are established by using the path-establishment signaling protocol (RSVP-TE). One of the two paths is a "working path 1" with a route of "node 1"→"node 2"→"node 3"→"node 4"→"node 5"; and the other is a "working path 2" with a route of "node 8"→"node 2"→"node 3"→"node 4"→"node 9".

To recover from a failure occurred at "node 2"-"node 3"-"node 4", a "backup path 1" and a "backup path 2" with a route "node 2"→"node 6"→"node 7"→"node 4" with the "node 2" as a start point and the "node 4" as an end point are established. The "backup path 1" is used as a detour for the "working path 1", and the "backup path 2" is used as a detour for the "working path 2". The "backup path 1" and the "backup path 2" are also established by using the path-establishment signaling protocol (RSVP-TE), like the working path.

Figure 28:
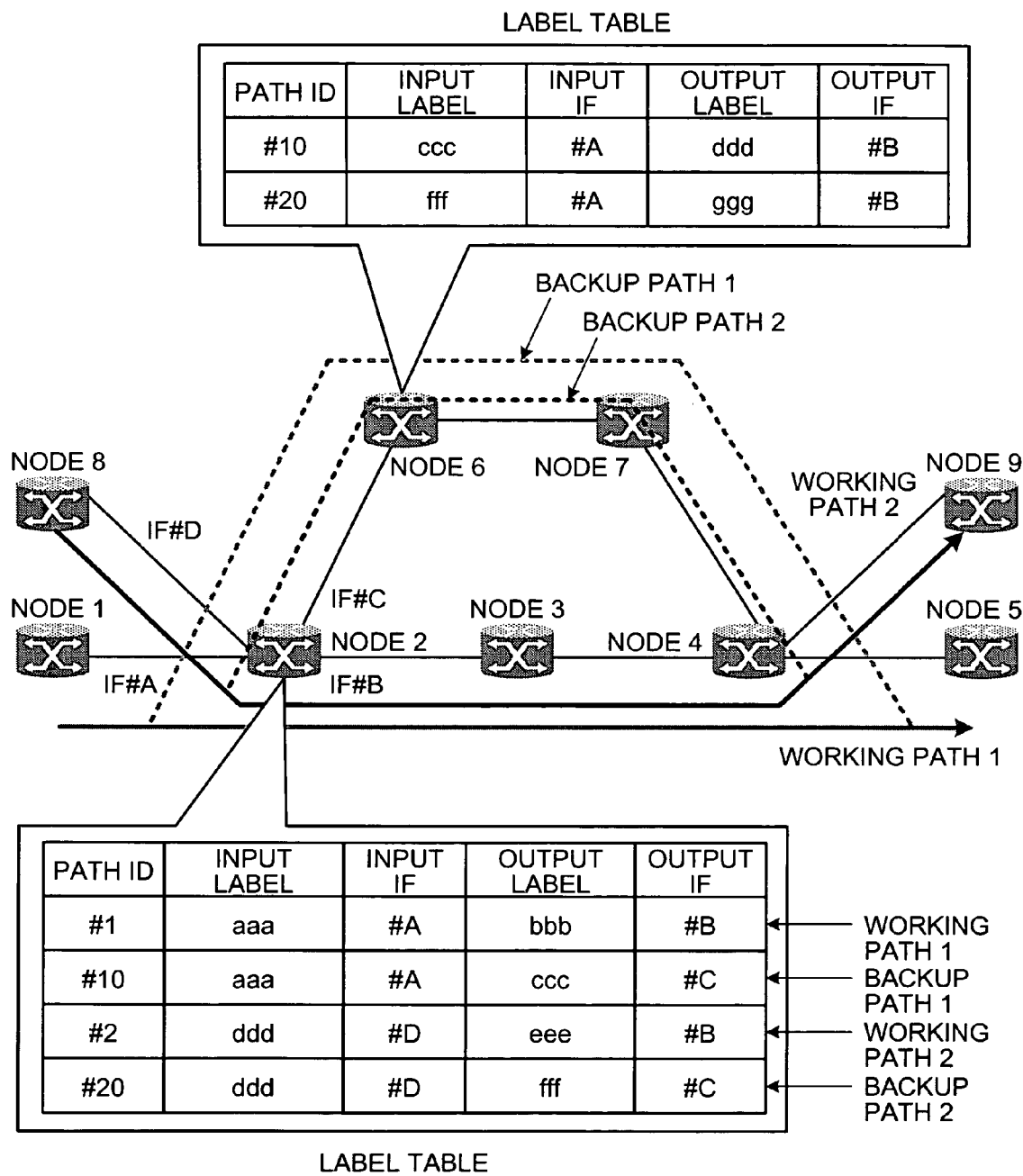
FIG. 28 is a second schematic diagram for illustrating an establishment of a working path and a backup path.

The "working path 1", the "working path 2", the "backup path 1", "backup path 2" established are shown in FIG. 28. An example of the label table built with the path-establishment signaling protocol is also shown in FIG. 28.

The "working path 1" and the "working path 2" pass the same section ("node 2"-"node 3"-"node 4"). Therefore, when a failure occurs in this section, both the "working path 1" and the "working path 2" are switched over to the backup path to take a detour for the traffic. In the previous cases, a monitoring path or a representative path established with respect to the common section has been used. However, in this example, a single error message is used for realizing a path switch of a plurality of paths without using any one of the monitoring path and the representative path.

Figure 30:
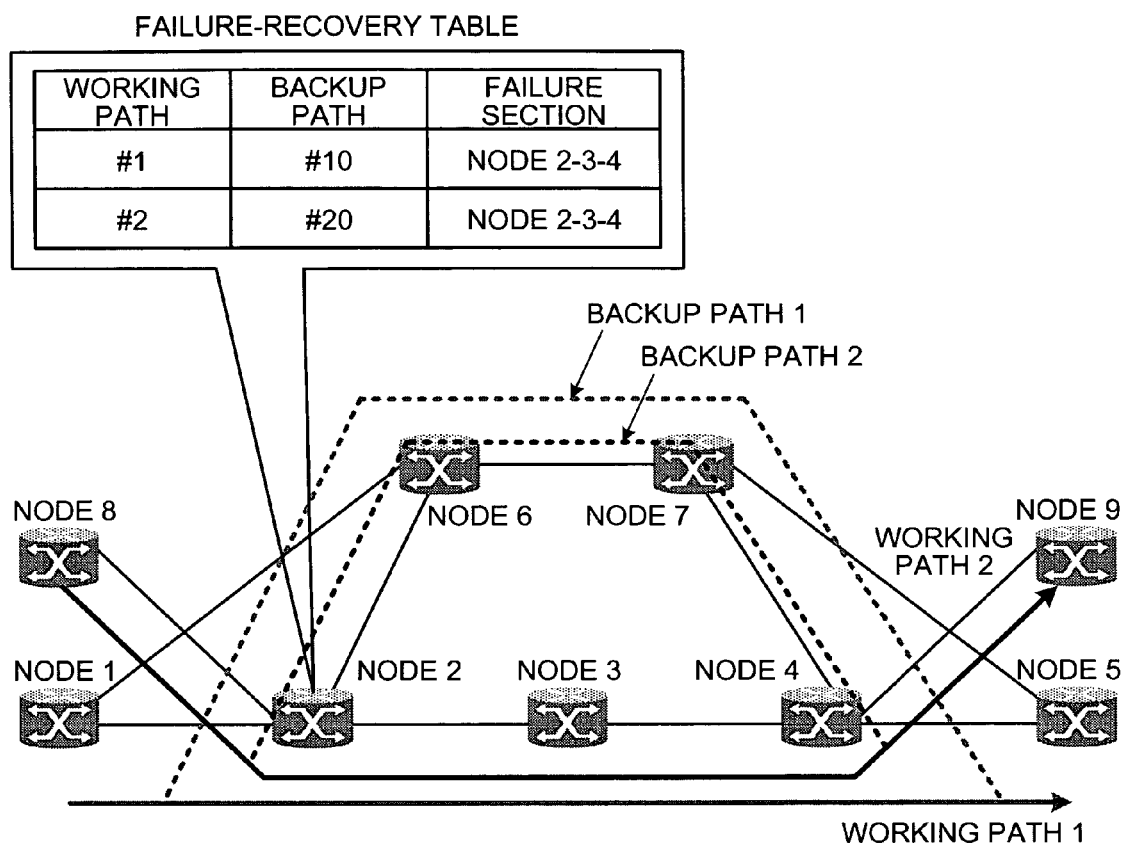
FIG. 30 is a schematic diagram for illustrating a correspondence between a working path and a backup path.

The "node 2" that becomes a path-switch node at the time of a failure holds the failure-recovery table, as shown in FIG. 29, which is a table for associating the backup path and a failure section, to determined a path switch from the working path to the backup path for which failure (FIG. 30). A working path ID, a backup-path ID, a representative-path ID, and the failure section are registered in the failure-recovery table, in association with each other. In this example, the path IDs of the "working path 1" and the "working path 2" are "#1" and "#2", respectively, the "backup path 1" and the "backup path 2" are "#10" and "#20", respectively.

Figure 31:
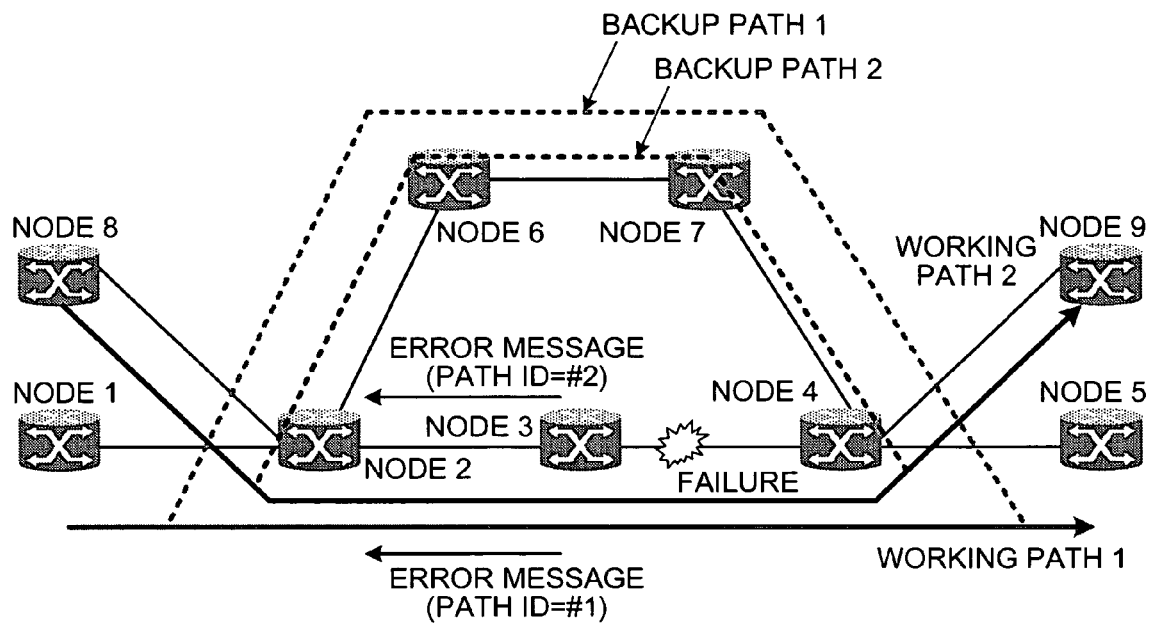
FIG. 31 is a fifth schematic diagram for illustrating a transmission of an error message at a time of a failure occurrence.

When a failure occurs between the "node 2"-"node 3"-"node 4", a relay node at an upstream detects the failure. In this example, there is a failure between the "node 3"-"node 4". Then, the "node 3" that detected the failure transmits an error message with respect to each of the working paths to each start-point node, to notify that the failure has occurred to the path-switch node "node 2". In the error message, an address of a failure point is included (FIG. 31).

The "node 2" that received the error message carries out the following process with respect to the error message arrived first. The "node 2" searches the failure-recovery table, based on the address of the failure point stored in the error message arrived first, and identifies the working path and the backup path. In this case, two sets of the working path and the backup path are obtained. Then, by transferring the traffic on the working path obtained to the corresponding backup path, it is possible to recover from the failure. The same process is carried out for an error message arrived next, however, when the working path obtained from a result of the search is already switched over, the corresponding working path is ignored.

Figure 32:
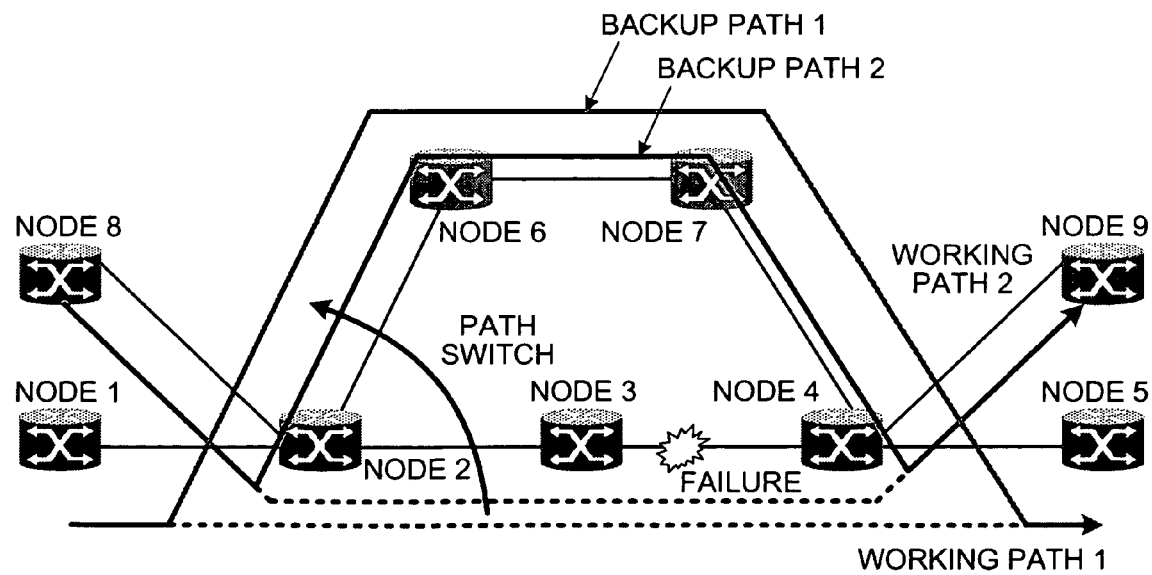
FIG. 32 is a fifth schematic diagram for illustrating a path switch for taking a detour around a failure.

In the eighth case, because the error message is created for every working path, a massive amount of error message can be created at the time of a failure to cause a congestion of the error message. However, because a route of all of the working paths affected by the failure is switched based on the error message arrived first, it is possible to recover from the failure quickly even when the error messages are created by the congestion (FIG. 32).

Figures 33, 34:
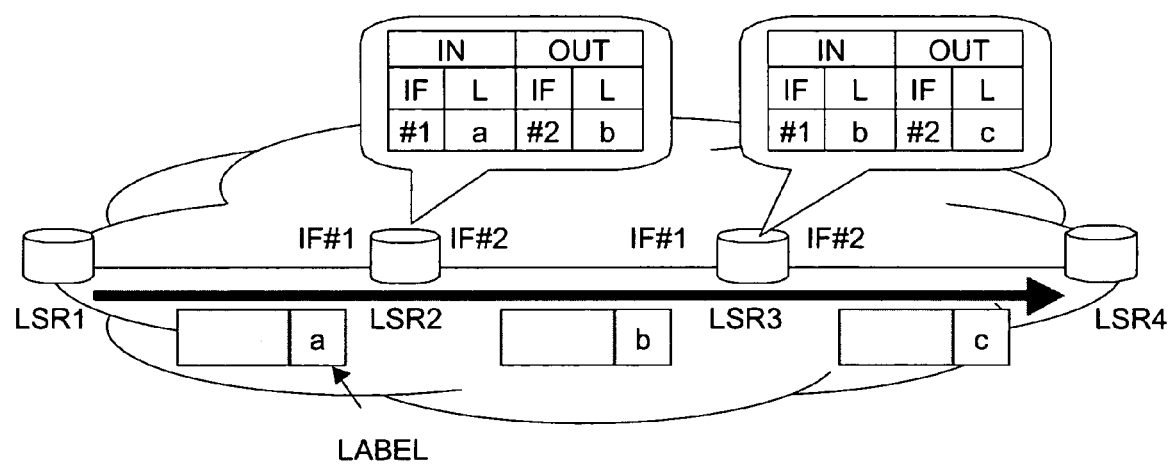
FIG. 33 is another example of a failure-recovery table when switching a plurality of paths with a single error message.
FIG. 34 is a schematic diagram for illustrating a transmission of a packet by using a fixed-length label.
Figure 35:
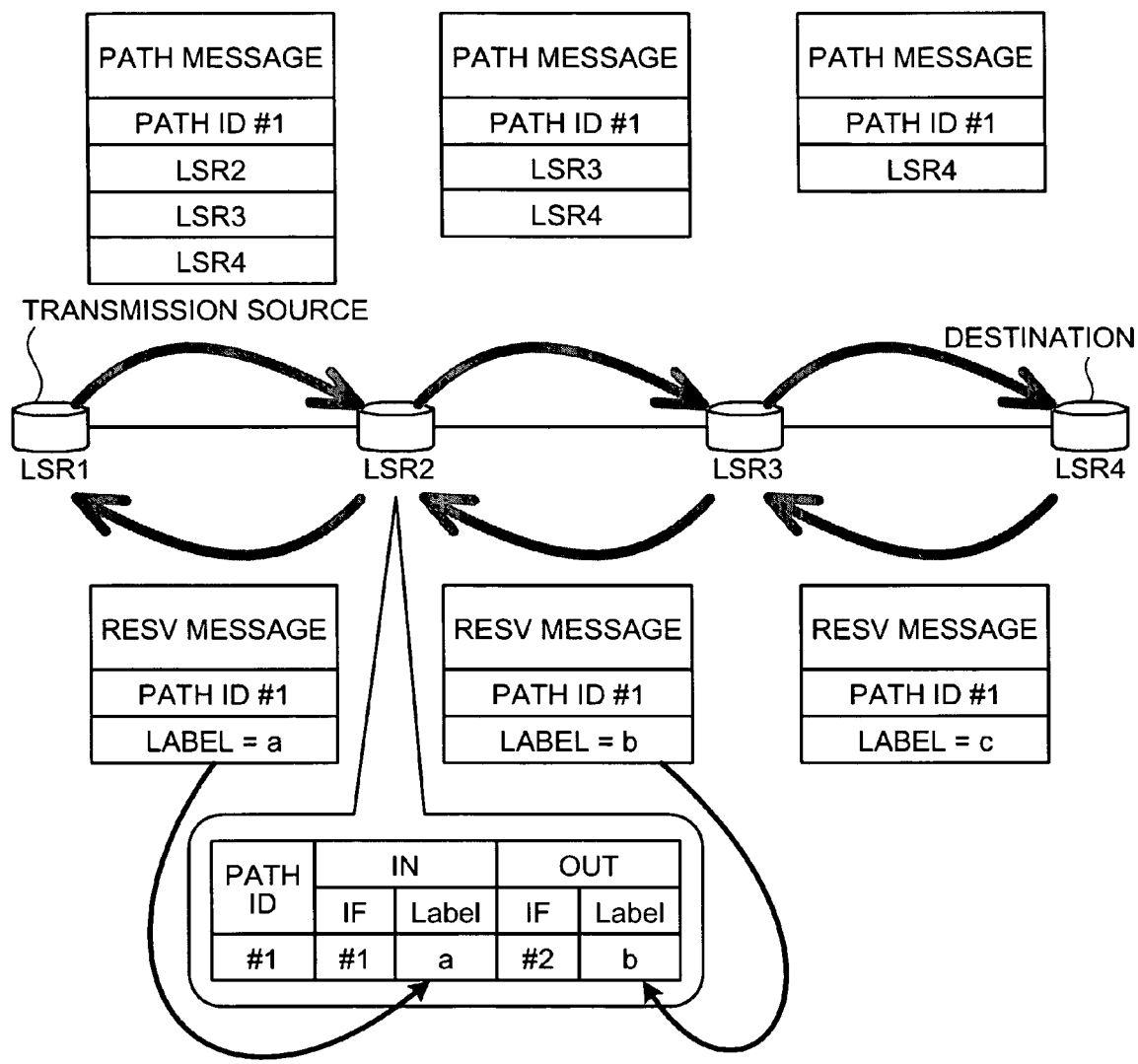
FIG. 35 is a schematic diagram for illustrating an operation of a path-establishment signaling protocol (RSVP-TE)
Figure 36:
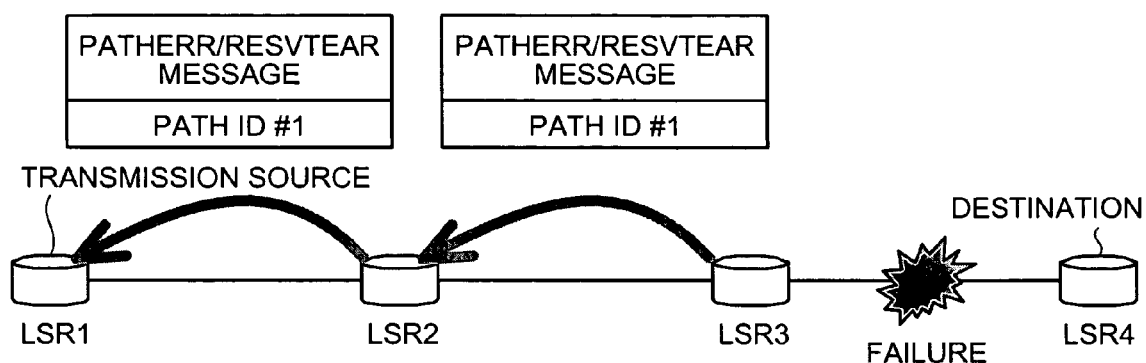
FIG. 36 is a schematic diagram for illustrating a transmission of an error message by using a PathErr/ResvTear message.
Figure 37:
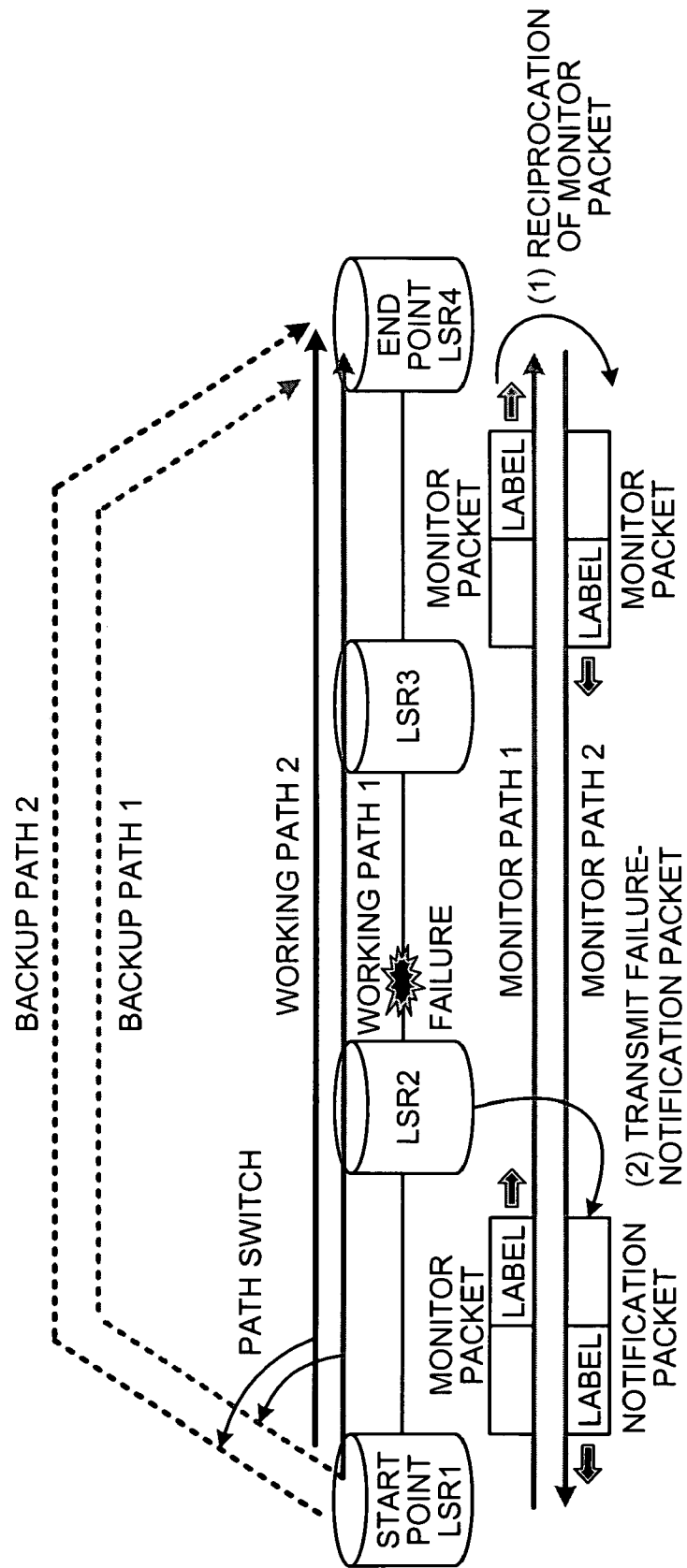
FIG. 37 is a schematic diagram for illustrating a failure recovery method using a monitoring path.

In addition, although the failure-recovery table shown in FIG. 29 is listed according to a path, by listing the failure-recovery table as shown in FIG. 33, it is possible to search for the corresponding working path and backup path at a fast pace.

As described above, according to the present embodiment, a backup path and a monitoring path are set with respect to not only a plurality of working path sharing the same route but also a plurality of working paths sharing a part of section, and a start-point node of the backup path includes the failure-recovery table 170 in which the working path, the backup path, and the monitoring path is associated with each other. Upon receiving an error message, the monitoring-path control unit 180c notifies the path-switch processing unit 190 that a failure has occurred. The path-switch processing unit 190 identifies the working path for which a path switch is necessary and a corresponding backup path. Then, a process of switching a path from the working path identified to the backup path is carried out. Therefore, it is possible to reduce the number of monitoring paths, and to suppress an increase of a network load at the time of a failure.

Furthermore, according to the present embodiment, it is possible to eliminate the monitoring path by using a representative path instead of the monitoring path. In addition, it is also possible to eliminate the representative path by carrying out switching a plurality of paths with a single error message.

Moreover, according to the present embodiment, although a case in which the working path control unit 180a, the backup-path control unit 180b, and the monitoring-path control unit 180c create the failure-recovery table 170 sequentially when establishing each of the paths is explained, the present invention is not limited to this scheme, but can also be applied similarly to a case in which the failure-recovery table 170 is created regardless of an establishment of a path.

According to the present invention, since the number of working paths that can be handled by a path for a recovery of a failure, such as a monitoring path, it is possible to decrease the number of paths for the recovery of the failure.

Furthermore, according to the present invention, since the number of working paths that can be handled by a single monitoring path is increased, it is possible to decrease the number of monitoring paths.

Moreover, according to the present invention, since a path switch from a plurality of working paths is carried out at once, it is possible to carry out a path switch from the working path efficiently.

Furthermore, according to the present invention, since a monitoring path is identified with ease, it is possible to carry out a process for the monitoring path efficiently.

Moreover, according to the present invention, since the number of working paths that can be handled by a single representative path is increased, it is possible to decrease the number of representative paths.

Furthermore, according to the present invention, since the number of working paths that can be handled by a single working path can be increased, it is possible to decrease the number of paths for a recovery of a failure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data relay apparatus that relays data in a network in which a failure recovery is carried out, when a failure occurs at any point on a working path that is being used as a path through which the data is transferred via a plurality of data relay apparatuses, by switching the working path to a backup path for taking a detour around a point of the failure, the data relay apparatus comprising:

a failure-recovery-information storing unit that stores failure-recovery information in which three paths that are the working path, the backup path and a failure-notifying-message transferring path are associated with one another, the failure-recovery-information storing unit storing the failure-recovery information only for a backup path in which the data relay apparatus becomes a start point, the failure-notifying-message transferring path being exclusively used for transferring failure notifying messages;

a failure-occurrence-notification receiving unit that receives a failure-occurrence notification via the failure-notifying-message transferring path, the failure-occurrence notification indicating that the failure has occurred in the working path; and a path-switch processing unit that searches for a backup path corresponding to the working path on which the failure has occurred, based on the failure-recovery information, and carries out a path-switch process, when the backup path is searched, in such a manner that the data to be transferred using the working path in which the failure has occurred is transferred using the backup path.

2. The data relay apparatus according to claim 1, wherein a path including a section that is shared by a plurality of working paths is set as the failure-notifying-message transferring path.

3. The data relay apparatus according to claim 2, wherein each of a plurality of backup paths, for which the failure-notifying-message transferring path is set, has a different start point.

4. The data relay apparatus according to claim 2, wherein
when each of a plurality of backup paths corresponding to the working paths has a different start point, a path including all of the different start points is set as the failure-notifying-message transferring path, and
the failure-occurrence notification is transmitted via the data relay apparatuses on the failure-notifying-message transferring path one by one.

5. The data relay apparatus according to claim 1, wherein a bypass tunnel is used for a plurality of backup paths having same route.

6. The data relay apparatus according to claim 1, further comprising a label table used for a relay of the data, wherein
upon registering information on a new working path in the label table, the data relay apparatus registers a path that shares an existing failure-notifying-message transferring path, by priority.

7. The data relay apparatus according to claim 1, further comprising a failure-notifying-message-transferring-path identifier for identifying the failure-notifying-message transferring path, wherein
the data relay apparatus identifies the failure-notifying-message transferring path based on the failure-notifying-message-transferring-path identifier.

8. The data relay apparatus according to claim 1, wherein when the failure has occurred at a point that is used by a plurality of working paths,
the failure-occurrence-notification receiving unit receives a plurality of failure-occurrence notifications corresponding to the working paths, and
the path-switch processing unit searches for a plurality of backup paths corresponding to the working paths for which the failure-occurrence notifications are received, and excludes, when carrying out the path-switch process, a working path for which the path-switch process has been already carried out by any one of the failure-occurrence notifications, from among the working paths for which the backup paths have been searched.

9. A data relay method of a data relay apparatus for relaying data in a network in which a failure recovery is carried out, when a failure occurs at any point on a working path that is being used as a path through which the data is transferred via a plurality of data relay apparatuses, by switching the working path to a backup path for taking a detour around a point of the failure, the data relay method comprising:

receiving a failure-occurrence notification via a failure-notifying-message transferring path, the failure-occurrence notification indicating that the failure has occurred in the working path, the failure-notifying-message transferring path being exclusively used for transferring failure notifying messages;

searching for the backup path corresponding to the working path in which the failure has occurred, based on failure-recovery information in which three paths that are the working path, the backup path and the failure-notifying-message transferring path are associated with one another, the failure-recovery information being stored only for a backup path in which a data relay apparatus becomes a start Doint; and switching, when the backup path is searched at the searching, in such a manner that the data to be transferred using the working path in which the failure has occurred is transferred using the backup path.

10. The data relay method according to claim 9, wherein a path including a section that is shared by a plurality of working paths is set as the failure-notifying-message transferring path.

11. The data relay method according to claim 10, wherein each of a plurality of backup paths, for which the failure-notifying-message transferring path is set, has a different start point.

12. The data relay method according to claim 10, wherein
when each of a plurality of backup paths corresponding to the working paths has a different start point, a path including all of the different start points is set as the failure-notifying-message transferring path, and
the failure-occurrence notification is transmitted via the data relay apparatuses on the failure-notifying-message transferring path one by one.

13. The data relay method according to claim 9, wherein a bypass tunnel is used for a plurality of backup paths having same route.

14. The data relay method according to claim 9, further comprising registering information in a label table used for a relay of the data, wherein
upon registering information on a new working path in the label table, the registering includes registering a path that shares an existing failure-notifying-message transferring path, by priority.

15. The data relay method according to claim 9, further comprising identifying the failure-notifying-message transferring path based on a failure-notifying-message-transferring-path identifier.

16. The data relay method according to claim 9, wherein when the failure has occurred at a point that is used by a plurality of working paths,
the receiving includes receiving a plurality of failure-occurrence notifications corresponding to the working paths, the searching includes searching for a plurality of backup paths corresponding to the working paths for which the failure-occurrence notifications are received, and the switching includes excluding, when carrying out the path-switch process, a working path for which the path-switch process has been already carried out by any one of the failure-occurrence notifications, from among the working paths for which the backup paths have been searched at the searching.

* * * * *